US012725963B2

(12) United States Patent
Tsang

(10) Patent No.: US 12,725,963 B2
(45) Date of Patent: Sep. 1, 2026

(54) FLOATING CONNECTOR ASSEMBLY

(71) Applicant: TE Connectivity Solutions GmbH, Schaffhausen (CH)

(72) Inventor: Albert Tsang, Harrisburg, PA (US)

(73) Assignee: TE CONNECTIVITY SOLUTIONS GmbH, Schaffhausen (CH)

(*) Notice: Subject to any disclaimer, the term of this patent is extended or adjusted under 35 U.S.C. 154(b) by 522 days.

(21) Appl. No.: 18/076,794

(22) Filed: Dec. 7, 2022

(65) Prior Publication Data

US 2024/0195116 A1 Jun. 13, 2024

(51) Int. Cl.

| | |
|---|---|
| ***H01R 13/516*** | (2006.01) |
| ***H01R 13/518*** | (2006.01) |
| ***H01R 13/631*** | (2006.01) |
| ***H01R 13/74*** | (2006.01) |

(52) U.S. Cl.

CPC ......... *H01R 13/516* (2013.01); *H01R 13/518* (2013.01); *H01R 13/631* (2013.01); *H01R 13/74* (2013.01)

(58) Field of Classification Search

CPC .. H01R 13/516; H01R 13/518; H01R 13/631; H01R 13/74

USPC ............................................ 439/571; 174/50

See application file for complete search history.

(56) References Cited

U.S. PATENT DOCUMENTS

| | | | |
|---|---|---|---|
| 9,017,087 B1 | 4/2015 | Rossman | |
| 9,155,214 B2 * | 10/2015 | Ritter | H04Q 1/14 |
| 9,160,088 B2 | 10/2015 | Rossman et al. | |
| 9,730,357 B2 | 8/2017 | Simpson et al. | |
| 2014/0133807 A1 * | 5/2014 | Katoh | G02B 6/3893 385/76 |
| 2022/0365288 A1 * | 11/2022 | Wong | G02B 6/3851 |

* cited by examiner

*Primary Examiner* — Tulsidas C Patel
*Assistant Examiner* — Thaslimur Rahman

(57) ABSTRACT

A connector assembly includes a connector holder having a frame including an upper frame member, a lower frame member, and first and second side frame members defining a connector chamber. The frame includes a rear frame member rearward of the connector chamber. The connector assembly includes a cable connector received in the connector chamber having a connector housing holding contact assemblies. The connector assembly includes a biasing member operably coupled between the cable connector and the rear frame member of the connector holder. The biasing member forward biases the cable connector and is compressible in a rearward compression direction to allow the cable connector to move rearward relative to the rear frame member.

19 Claims, 20 Drawing Sheets

FLOATING CONNECTOR ASSEMBLY

BACKGROUND OF THE INVENTION

The subject matter herein relates generally to communication systems.

Communication systems use electrical connectors to transmit data between components of the communication system. For example, electrical connectors may be held in a rack, chassis, cabinet or other system component. Mating connectors are mated to the electrical connectors. For example, the mating connectors may be mounted to a card assembly, such as a daughtercard or server card, which is plugged into the chassis. Proper mating of the mating connector with the electrical connector is necessary for proper operation of the communication system. For example, misalignment of the connectors may lead to damage to the contacts of the connectors. Additionally, partial mating of the connectors may lead to reduction in signal integrity due to partial mating of contacts and/or improper shielding of the signal contacts. In some systems, the server card may be mated with the assistance of a lever or other mechanical assist device to plug the server card into the chassis. Such mechanical loading of the server card may lead to damage to the electrical connector. Additionally, mounting of the electrical connectors within the rack may require special tools or mounting hardware, which adds cost and complexity to the system.

A need remains for a cost effective and reliable communication system.

BRIEF DESCRIPTION OF THE INVENTION

In one embodiment, a connector assembly is provided and includes a connector holder having a frame defining a connector chamber. The frame extends between a front and a rear of the connector holder. The frame includes an upper frame member, a lower frame member, and first and second side frame members extends between the upper and lower frame members to define the connector chamber. The frame includes a rear frame member rearward of the connector chamber. The connector assembly includes a cable connector received in the connector chamber. The cable connector includes a connector housing holding contact assemblies. Each contact assembly includes a signal contact and a cable terminated to the signal contact. The connector assembly includes a biasing member operably coupled between the cable connector and the rear frame member of the connector holder. The biasing member forward biasing the cable connector. The biasing member is compressible in a rearward compression direction to allow the cable connector to move rearward relative to the rear frame member.

In a further embodiment, a connector assembly is provided and includes a connector holder having a frame defining a connector chamber. The frame extends between a front and a rear of the connector holder. The frame includes an upper frame member, a lower frame member, and first and second side frame members extends between the upper and lower frame members to define the connector chamber. The frame includes a rear frame member rearward of the connector chamber. The connector assembly includes a cable connector received in the connector chamber. The cable connector includes a connector housing holding contact assemblies. Each contact assembly includes a signal contact and a cable terminated to the signal contact. The connector assembly includes a biasing assembly operably coupled between the cable connector and the rear frame member of the connector holder. The biasing assembly includes a biasing member and a slider. The slider is coupled to the cable connector and holding the cable connector relative to the frame. The slider slidably coupled to the frame and movable between a forward position and a rearward position. The biasing member coupled to the slider and coupled to the rear frame member. The biasing member forward biasing the slider and the cable connector to the forward position. The biasing member is compressible in a rearward compression direction when the slider and the cable connector are moved to the rearward position.

In a further embodiment, a connector assembly is provided and includes a connector holder having a frame defining a connector chamber. The frame extends between a front and a rear of the connector holder. The frame includes a brick has an upper frame member, a lower frame member, and first and second side frame members extends between the upper and lower frame members to define the connector chamber. The frame includes a rear frame member rearward of the brick. The brick includes a channel. The connector assembly includes a cable connector received in the connector chamber and coupled to the brick. The cable connector includes a connector housing holding contact assemblies. Each contact assembly includes a signal contact and a cable terminated to the signal contact. The connector assembly includes a biasing assembly operably coupled between the cable connector and the rear frame member of the connector holder. The biasing assembly includes a biasing member and a slider. The slider is received in the channel. The slider has a rear end coupled to the rear frame member. The slider includes a front end has a panel mount forward of the brick configured to be mounted to a panel, wherein the brick is slidable along the slider between a forward position and a rearward position. The biasing member coupled between the rear frame member and the brick. The biasing member forward biasing the brick and the cable connector to the forward position. The biasing member is compressible in a rearward compression direction when the brick and the cable connector are moved to the rearward position.

DETAILED DESCRIPTION OF THE INVENTION

Figure 1:
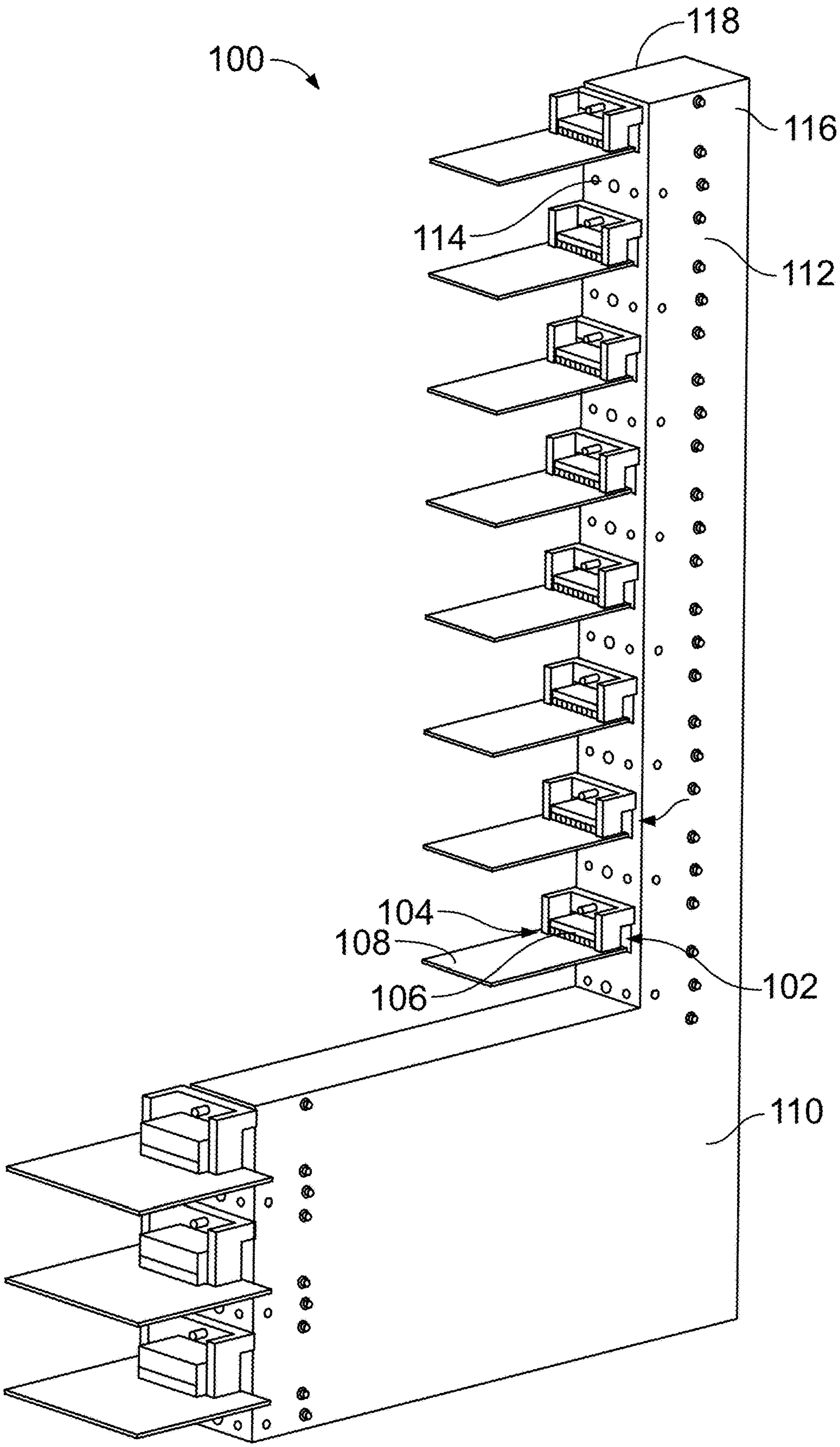
FIG. 1 illustrates a communication system in accordance with an exemplary embodiment.

FIG. 1 illustrates a communication system 100 in accordance with an exemplary embodiment. The communication system 100 includes at least one connector assembly 102 and at least one mating connector assembly 104 mated with the corresponding at least one connector assembly 102. In the illustrated embodiment, each mating connector assembly 104 includes a mating electrical connector 106 mounted to a circuit board 108, such as a backplane, a daughter card, a network switch, and the like. In various embodiments, the communication system 100 may include an equipment rack or chassis that supports the circuit boards 108. The circuit boards 108 may be pluggable into the equipment rack or chassis to mate the mating electrical connector 106 with the corresponding connector assembly 102.

In an exemplary embodiment, the communication system 100 includes a cabinet or cartridge 110 that holds the connector assemblies 102. The cartridge 110 may be coupled to the rack or chassis that receives the circuit boards 108. The cartridge 110 forms an enclosed space for the connector assemblies 102 and the cables extending from the connector assemblies 102. The cables may be routed within the enclosed space formed by the cartridge 110 to electrically connect between the various connector assemblies 102. Optionally, the cables may exit the cartridge 110 at a cable exit, which may be provided at the rear of the cartridge 110.

In an exemplary embodiment, the cartridge 110 is formed from a plurality of panels 112, such as sheet metal panels. The cartridge 110 includes a front panel 114, a first side panel 116, and a second side panel 118. The panels 112 may additionally include upper panels and/or lower panels and/or rear panels. The connector assemblies 102 are provided at the front panel 114 for mating with the mating electrical connectors 106. In an exemplary embodiment, the connector assemblies 102 may be coupled to the first and second side panels 116, 118. However, the connector assemblies 102 may additionally or alternatively be coupled to the front panel 114.

Figure 2:
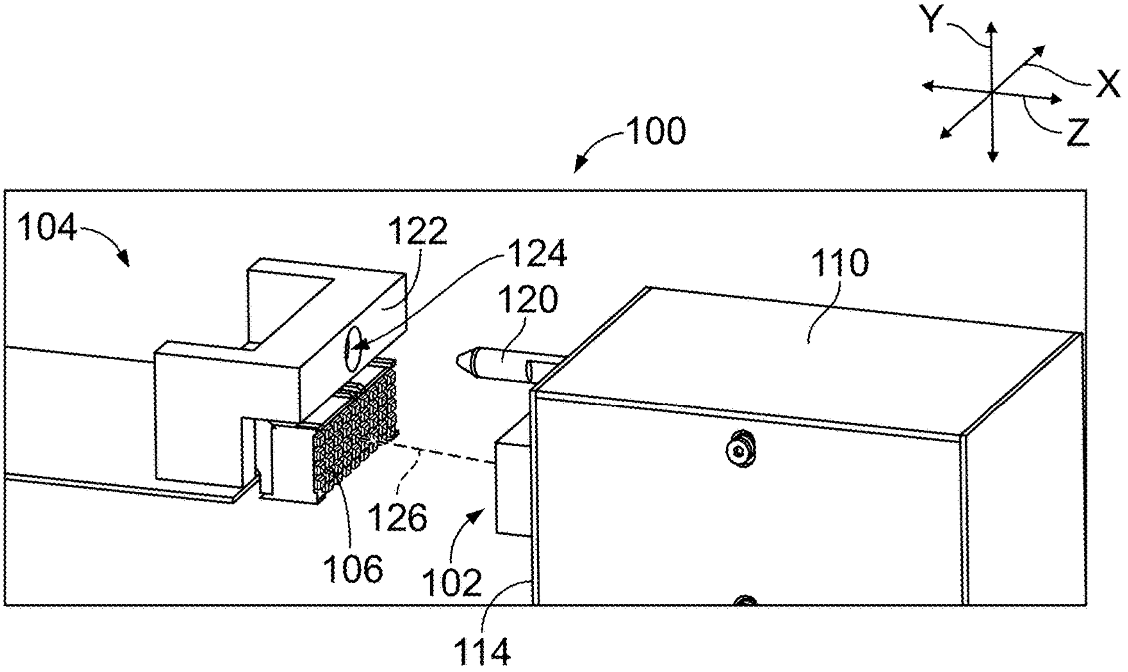
FIG. 2 is a perspective view of a portion of the communication system showing one of the mating connector assemblies poised for coupling to the corresponding connector assembly in accordance with an exemplary embodiment.

FIG. 2 is a perspective view of a portion of the communication system 100 showing one of the mating connector assemblies 104 poised for coupling to the corresponding connector assembly 102. The connector assembly 102 is received in the cartridge 110. The connector assembly 102 is provided at the front panel 114 for mating with the mating connector assembly 104 along a mating axis 126. In the illustrated embodiment, the mating axis 126 extend along the Z-axis.

In an exemplary embodiment, a mating guide 120 is provided to guide mating of the mating electrical connector 106 with the connector assembly 102. In the illustrated embodiment, the mating guide 120 includes a guide post extending forward of the mating ends of the connector assembly 102. Other types of guide features may be used in alternative embodiments. The mating guide 120 is configured to be coupled to a mating guide 122 for the mating connector assembly 104. In the illustrated embodiment, the mating guide 122 includes an opening 124 that receives the mating guide 120. The mating guides 120, 122 are used to align the mating ends of the connector assembly 102 and the mating electrical connector 106, such as to align contacts of the connector assembly 102 with mating contacts of the mating electrical connector 106. For example, the mating guides 120, 122 may be used to align the connectors in one or more lateral directions transverse to the mating axis 126, such as along the X-axis and/or the Y-axis. In various embodiments, the mating guides 120, 122 may provide both horizontal alignment (X-axis) and vertical alignment (Y-axis).

Figure 3:
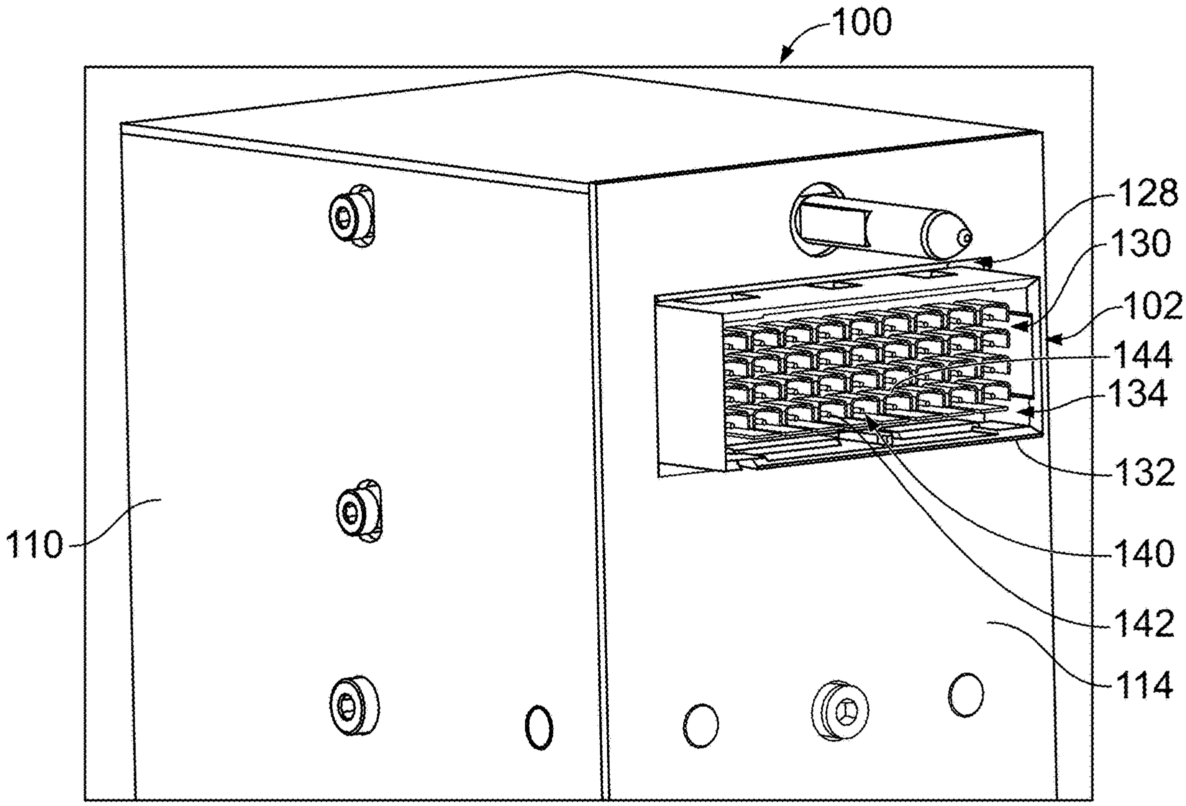
FIG. 3 is a front perspective view of a portion of the communication system showing one of the connector assemblies coupled to the cartridge in accordance with an exemplary embodiment.

FIG. 3 is a front perspective view of a portion of the communication system 100 showing one of the connector assemblies 102 coupled to the cartridge 110. The connector assembly 102 includes a cable connector 130. The mating end of the cable connector 130 passes through an opening 128 in the front panel 114 for mating with the mating electrical connector 106 (FIG. 2).

The cable connector 130 includes a connector housing 132 holding contact assemblies 140. The connector housing 132 includes a cavity 134 that receives the mating end of the mating electrical connector 106. The contact assemblies 140 are arranged in the cavity 134, such as in rows and columns. The walls of the connector housing 132 may be chamfered and have a lead-in surfaces to guide mating of the mating electrical connector 106 in the cavity 134. The connector housing 132 may have guide features to properly position the mating electrical connector 106 within the cavity 134.

Each contact assembly 140 includes at least one signal contact 142, which is configured to be electrically connected to a corresponding wire of the cable 150 extending from the cable connector 130. In the illustrated embodiment, each contact assembly 140 includes a pair of the signal contacts 142, which define a differential pair. In various embodiments, the signal contacts 142 may be pin contacts. However, in alternative embodiments, the signal contacts 142 may be socket contacts, spring beam contacts, or other types of contacts. The signal contacts 142 may be stamped and formed contacts. Each contact assembly 140 includes a shield 144 provide electrical shielding for the signal contacts 142. The shield 144 is configured to be electrically connected to the wire shield of the wire and/or the cable shield of the cable. In the illustrated embodiment, the shield 144 is C-shaped providing electrical shielding on three sides of the pair of signal contacts 142. The shield 144 may have other shapes in alternative embodiments. The shield 144 may be a stamped and formed shield.

Figure 4:
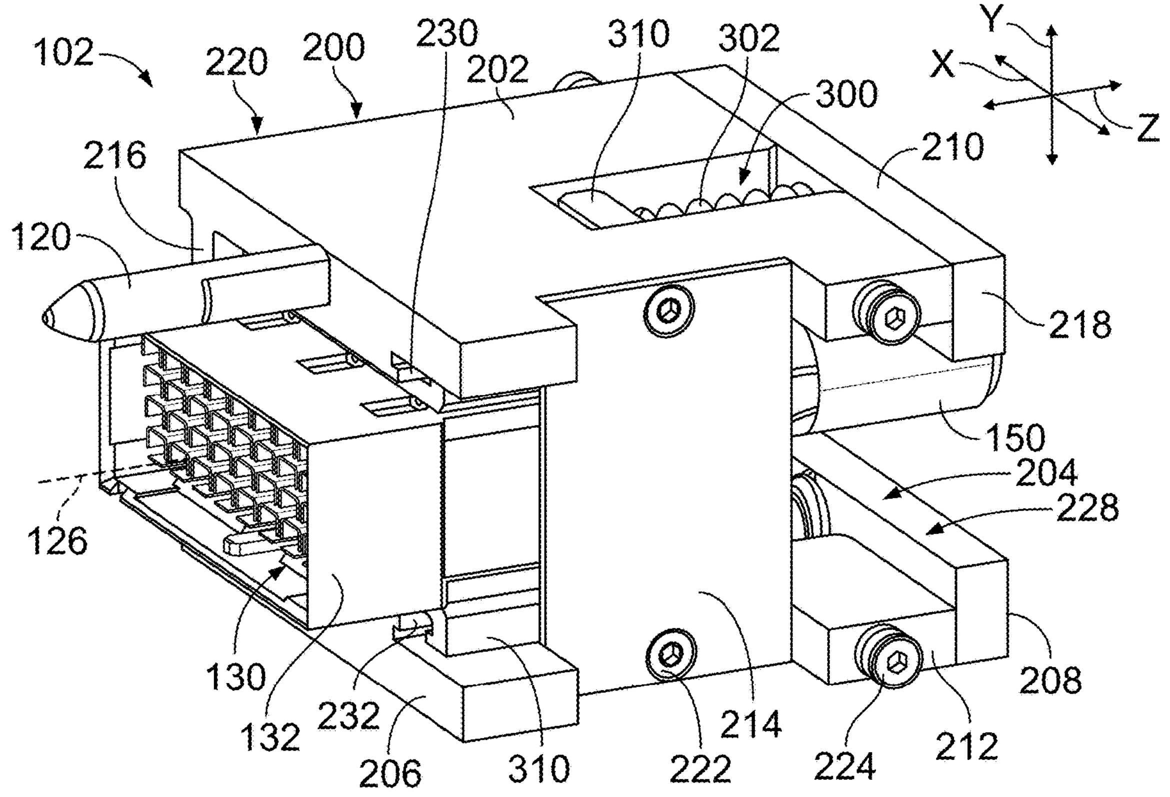
FIG. 4 is a front perspective view of the connector assembly in accordance with an exemplary embodiment.
Figure 5:
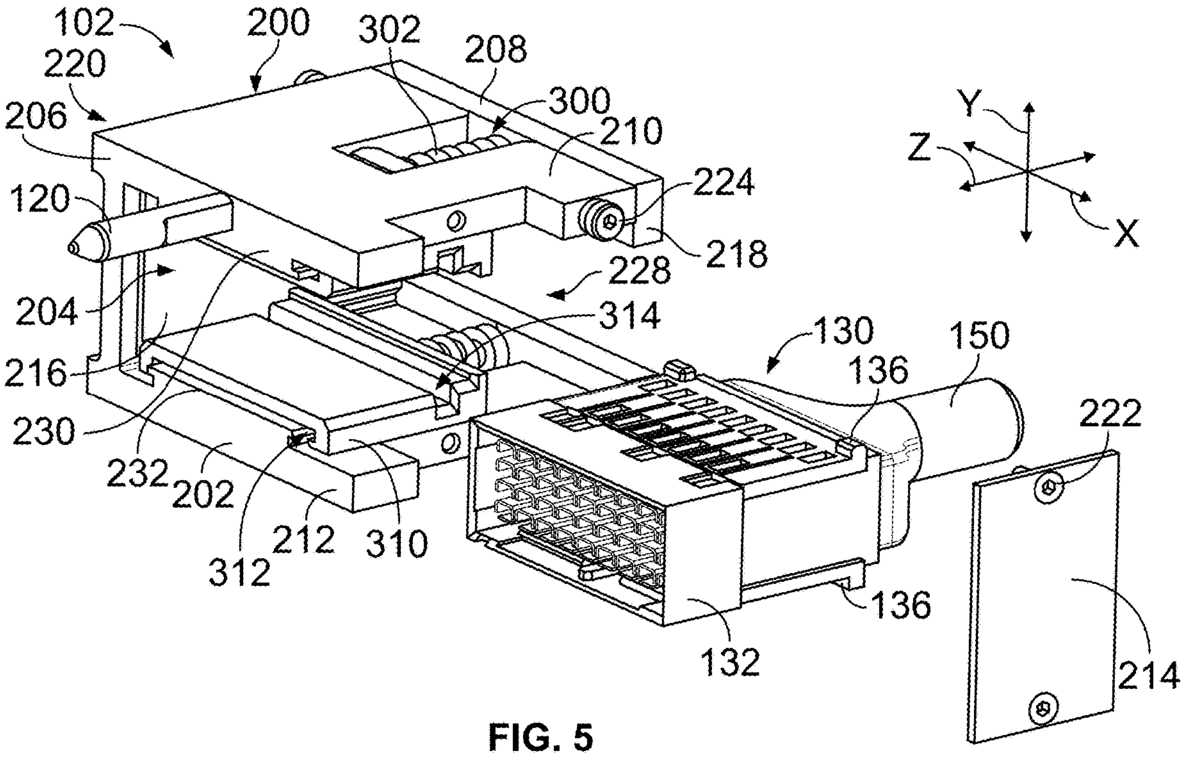
FIG. 5 is a front perspective, exploded view of the connector assembly in accordance with an exemplary embodiment.
Figure 6:
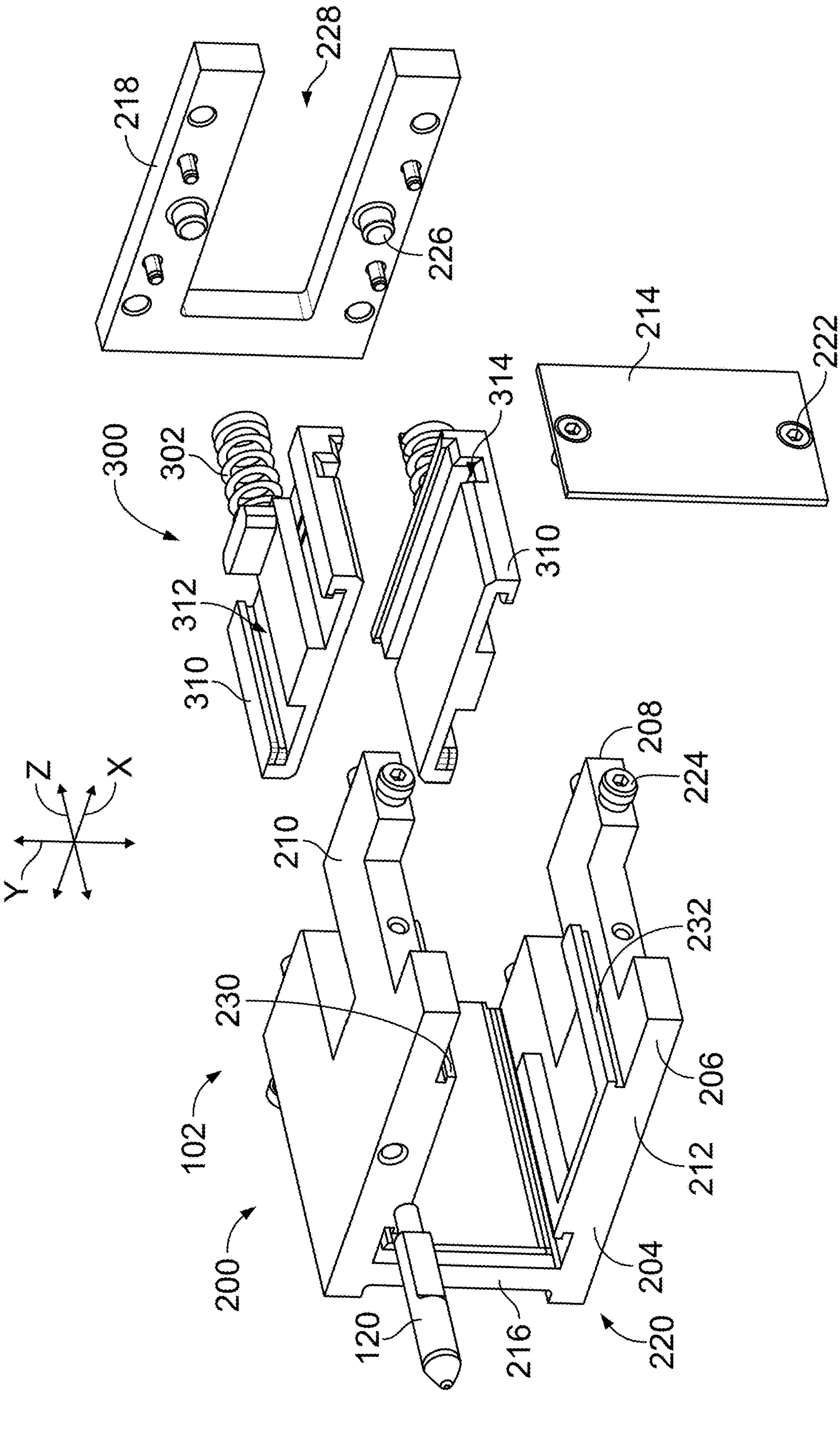
FIG. 6 is a front perspective, exploded view of a portion of the connector assembly with the cable connector removed to illustrate other components of the connector assembly in accordance with an exemplary embodiment.

FIG. 4 is a front perspective view of the connector assembly 102 in accordance with an exemplary embodiment. FIG. 5 is a front perspective, exploded view of the connector assembly 102 in accordance with an exemplary embodiment. FIG. 6 is a front perspective, exploded view of a portion of the connector assembly 102 with the cable connector 130 removed to illustrate other components of the connector assembly 102.

The connector assembly 102 includes a connector holder 200 used to hold the cable connector 130. The connector holder 200 is configured to be coupled to the cartridge 110 (FIG. 3) to position the cable connector 130 relative to the cartridge 110. In an exemplary embodiment, the cable connector 130 is movable relative to the connector holder 200 to position the cable connector 130 during mating with the mating electrical connector 106 (FIG. 2). For example, the cable connector 130 may be movable along the mating axis 126 (along the Z-axis) to accommodate overtravel of the mating connector assembly 104 during mating. In various embodiments, the cable connector 130 may have a limited amount of floating movement relative to the connector holder 200 to accommodate misalignment of the cable connector 130 relative to the mating electrical connector 106. For example, the cable connector 130 may be movable relative to the connector holder 200 along the X-axis and/or along the Y-axis to accommodate misalignment of the cable connector 130 relative to the mating electrical connector 106. The connector holder 200 may limit or confine the amount of floating movement in the lateral floating directions X/Y. For example, the connector holder 200 may limit floating movement to 1.0 mm.

The connector holder 200 includes a frame 202 defining a connector chamber 204. The cable connector 130 is received in the connector chamber 204. The frame 202 supports the cable connector 130 in the connector chamber 204. The frame 202 extends between a front 206 and a rear 208 of the connector holder 200. The mating ends of the cable connector 130 is provided at or forward of the front 206 of the connector holder 200 for mating with the mating electrical connector 106. The cable 150 extends from the rear 208 of the connector holder 200. The mating guide 120 extends forward from the front 206, such as above the cable connector 130. Other locations are possible in alternative embodiments, such as the bottom for one or both sides of the frame 202.

In an exemplary embodiment, the frame 202 includes an upper frame member 210, a lower frame member 212, a first side frame member 214, a second side frame member 216, and a rear frame member 218. The connector chamber 204 is defined between the upper frame member 210 and the lower frame member 212. The connector chamber 204 is defined between the first and second side frame members 214, 216. The upper frame member 210, the lower frame member 212, the first side frame member 214, and the second side frame member 216 forming a brick 220 used to hold the cable connector 130. The brick 220 is a rectangular structure that surrounds the connector chamber 204. The brick 220 is configured to be coupled to the cartridge 110 to hold the cable connector 130 relative to the cartridge 110. The connector chamber 204 is located forward of the rear frame member 218. The rear frame member 218 may be coupled to the brick 220. The rear frame member 218 closes off the connector chamber 204 from behind.

In an exemplary embodiment, the second side frame member 216 is separate and discrete from the upper and lower frame members 210, 212. The second side frame member 216 is coupled to the upper and lower frame members 210, 212 using fasteners 222. The second side frame member 216 may be coupled to the upper and lower frame members 210, 212 after the cable connector 130 is loaded into the connector chamber 204 through the second side. However, in alternative embodiments, the second side frame member 216 may be integral with the upper frame member 210 and/or the lower frame member 212, such as being diecast with and/or stamped and formed from a common metal material.

In an exemplary embodiment, the first side frame member 214 is integral with the upper and lower frame members 210, 212. For example, the first side frame member 214 may be diecast with the upper and lower frame members 210, 212 into a U-shaped structure having a closed first side and open second side configured to receive the cable connector 130 into the connector chamber 204 through the open second side. However, in alternative embodiments, the first side frame member 214 may be separate and discrete from the upper and lower frame members 210, 212 and coupled thereto using fasteners.

In an exemplary embodiment, the rear frame member 218 is coupled to the upper frame member 210 and/or the lower frame member 212 using fasteners. The rear frame member 218 may be fixed in place relative to the upper and lower frame members 210, 212 using the fasteners. However, in alternative embodiments, the rear frame member 218 may be separate from the upper and lower frame members 210, 212, which may allow the upper and lower frame members 210, 212 to move relative to the rear frame member 218, such as to allow the cable connector 130 to move relative to the rear frame member 218 (for example, along the mating axis in the Z-direction).

In an exemplary embodiment, mounting features 224 extend from the brick 220 to mount the brick 220 to the cartridge 110. In the illustrated embodiment, the mounting features 224 are threaded fasteners coupled to the upper frame member 210 and the lower frame member 212. Other types of securing components may be used in alternative embodiments. The mounting features 224 may be located at other locations in alternative embodiments.

In an exemplary embodiment, the connector assembly 102 includes a biasing assembly 300 operably coupled between the cable connector 130 and the connector holder 200. The biasing assembly 300 allows the cable connector 130 to move relative to the connector holder 200. For example, the biasing assembly 300 allows the cable connector 130 to move along the mating axis 126 (Z-direction), such as to accommodate overtravel of the mating connector assembly 104 during mating. In an exemplary embodiment, the biasing assembly 300 includes one or more biasing members 302. In the illustrated embodiment, the biasing member 302 is a compression spring, such as a coil spring. However, other types of biasing members may be used in alternative embodiments. The biasing member 302 may include other types of springs, such as a leaf spring, a Belleville spring, a wave spring, a torsion spring. The biasing member 302 may include another type of compression element, such as a foam compression member, a rubber compression member, and the like.

The biasing member 302 is coupled to the rear frame member 218. For example, the rear frame member 218 may include a mounting post 226 that receives the biasing member 302. Other types of mounting features may be used in alternative embodiments. In the illustrated embodiment, the mounting posts 226 are provided along the upper and lower arms of the rear frame member 218 located on opposite sides of a cable exit 228 through the rear frame member 218.

In various embodiments, the biasing members 302 may directly engage the cable connector 130 to forward bias the cable connector 130 relative to the rear frame member 218. However, in alternative embodiments, the biasing assembly 300 may include one or more sliders 310 between the biasing member 302 and the cable connector 130. The sliders 310 are movable relative to the brick 220. The sliders 310 hold the cable connector 130 and allow the cable connector 130 to move relative to the brick 220. The biasing members 302 forward bias the sliders 310 and thus the cable connector 130 relative to the rear frame member 218 and hold the cable connector 130 in a forward position for mating with the mating electrical connector 106. In the illustrated embodiment, a pair of sliders 310 and a pair of the biasing members 302 are provided. The cable connector 130 is held between the sliders 310.

In an exemplary embodiment, the sliders 310 are coupled to the upper frame member 210 and the lower frame member 212. For example, the upper frame member 210 includes a rail 230 and the lower frame member 212 includes a rail 232. Each slider 310 includes a track 312 that receives the corresponding rail 230, 232. The rails 230, 232 guide movement of the sliders 310 relative to the upper and lower frame members 210, 212. For example, the rails 230, 232 limit movement of the sliders 310 to movement parallel to the mating axis (Z-direction).

In an exemplary embodiment, each slider 310 includes a slot 314 that receives a mounting lug 136 that extend from the connector housing 132. In the illustrated embodiment, the slot 314 extends crosswise across the slider 310 between the opposite sides of the slider 310 (X-direction). In an exemplary embodiment, the slider 310 is oversized relative to the connector housing 132 allowing the mounting lugs 136 to move side-to-side within the slots 314 to allow a limited amount of lateral floating movement of the cable connector 130 relative to the slider 310. As such, the connector housing 132 is movable in the X-direction relative to the sliders 310 and the connector holder 200. The amount of lateral movement may be limited to a confined amount by the first and second side frame members 214, 216 (for example, 1.0 mm).

In an exemplary embodiment, the sliders 310 may have a spacing therebetween to receive the cable connector 130. The spacing may be slightly taller than the height of the connector housing 132 to allow a limited amount of floating movement of the cable connector 130 between the sliders 310. As such, the connector housing 132 is movable in the Y-direction relative to the sliders 310 and the connector holder 200. The spacing between the sliders 310 limits the amount of floating movement to a confined amount (for example, 1.0 mm).

Figure 7:
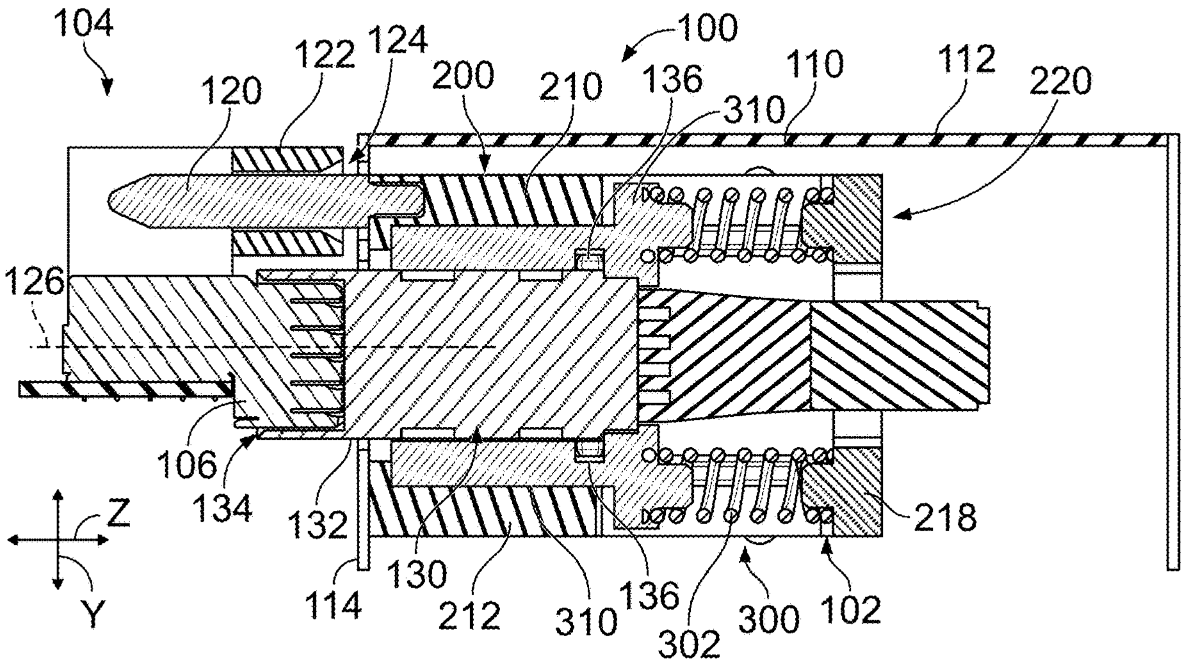
FIG. 7 is a cross-sectional view of a portion of the communication system showing the mating connector assembly mated with the connector assembly in accordance with an exemplary embodiment.

FIG. 7 is a cross-sectional view of a portion of the communication system 100 showing the mating connector assembly 104 mated with the connector assembly 102. The cable connector 130 is held relative to the cartridge 110 by the connector holder 200. For example, the connector holder 200 is coupled to the cartridge 110 such that the mating ends of the cable connector 130 passes through the opening 124 in the front panel 114 for mating with the mating electrical connector 106.

During mating, the mating guide 120 interfaces with the mating guide 122 to generally align the mating electrical connector 106 with the cable connector 130. During final mating, the walls of the connector housing 132 interface with the mating electrical connector 106 as the mating electrical connector 106 is plugged into the cavity 134. In an exemplary embodiment, the cable connector 130 is able to move relative to the connector holder 200 in a floating direction to accommodate misalignment of the mating electrical connector 106 and the cable connector 130. For example, the connector housing 132 of the cable connector 130 may move in the vertical direction (Y-direction) between the upper and lower sliders 310 to align the cable connector 130 with the mating electrical connector 106.

In an exemplary embodiment, the connector holder 200 may be movable relative to the cartridge 110 to accommodate misalignment between the cable connector 130 and the mating electrical connector 106. For example, the mounting features 224 (see FIG. 3) holding the connector holder 200 to the panels 112 of the cartridge 110 may be slidable along the panels 112. For example, the openings in the panels 112 that receive the mounting features 224 may be elongated or oversized to allow floating movement of the fasteners within the openings to allow a limited amount of vertical floating movement.

During mating, the mating connector assembly 104 is plugged into the rack or chassis in a mating direction along the mating axis 126. The mating ends of the mating electrical connector 106 is plugged into the cavity 134 of the connector housing 132 to electrically connect the signal contacts and the shields with the mating electrical connector 106. Once fully mated, further loading of the mating connector assembly 104 in the mating direction causes compression of the biasing assembly 300. For example, the biasing members 302 are compressed allowing the sliders 310 and the cable connector 130 to move in a rearward compression direction to accommodate the overloading of the mating connector assembly 104. The sliders 310 and the cable connector 130 are moved in the rearward compression direction toward the rear frame member 218. The sliders 310 slide relative to the brick 220. For example, the sliders 310 slide rearward relative to the upper frame member 210 and the lower frame member 212. The mounting lugs 136 transfer forces and movement between the cable connector 130 and the sliders 310.

The biasing members 302 are compressible in the rearward compression direction to allow the cable connector 130 to move to a rearward position, which prevents damage to the cable connector 130 and the mating electrical connector 106 during the mating process. In an exemplary embodiment, the biasing members 302 may be preloaded to a predetermined spring force. As such, the biasing members 302 are not compressed until the predetermined spring force is exceeded. The preload spring force may be greater than the mating force to fully mate the mating electrical connector 106 with the cable connector 130. For example, the mating force may be defined by the force required to mate the signal contacts and the shields. In various embodiments, the mating force may be less than 20 pounds. The preload spring force may be set at 20 pounds to allow mating of the signal contacts and the shields without rearward movement of the cable connector 130. The biasing members 302 compress only when the preload force is exceeded.

Figure 8:
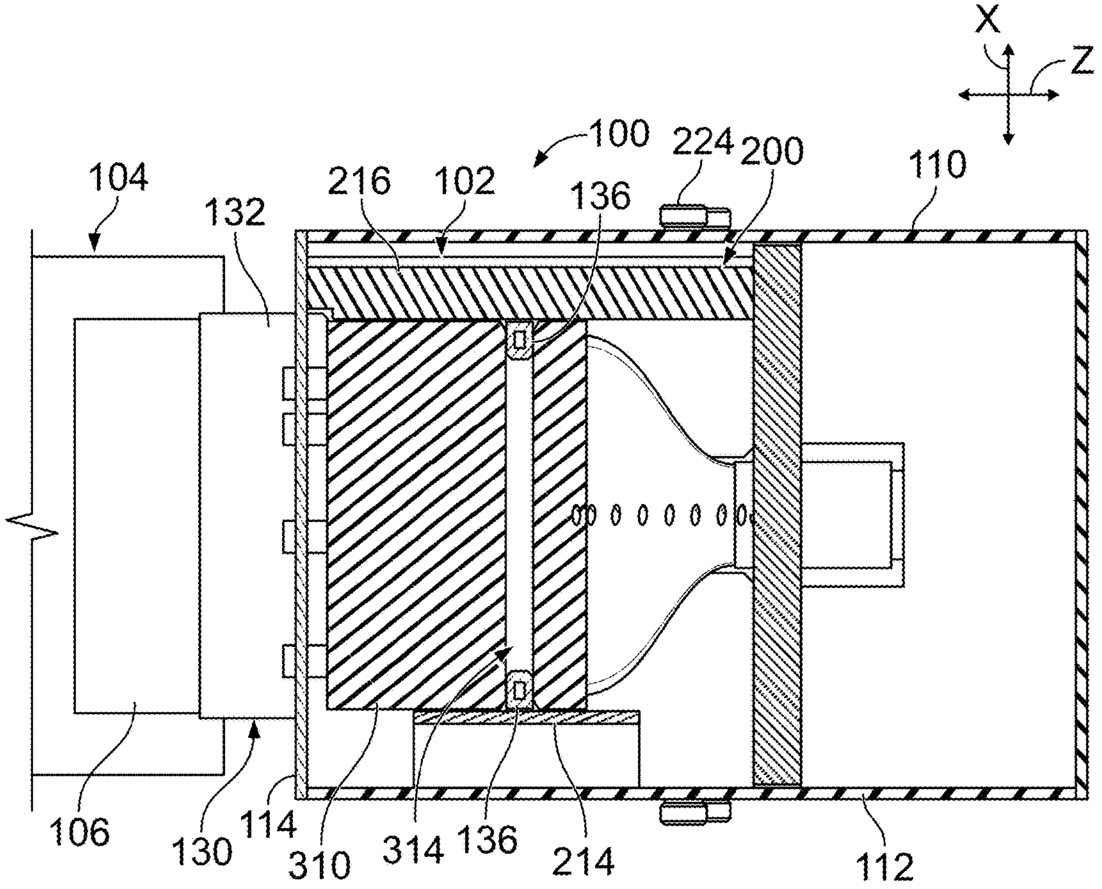
FIG. 8 is a cross-sectional view of a portion of the communication system showing the mating connector assembly mated with the connector assembly in accordance with an exemplary embodiment.

FIG. 8 is a cross-sectional view of a portion of the communication system 100 showing the mating connector assembly 104 mated with the connector assembly 102. The cable connector 130 is held relative to the cartridge 110 by the connector holder 200. For example, the connector holder 200 is coupled to the cartridge 110 such that the mating ends of the cable connector 130 passes through the opening 124 in the front panel 114 for mating with the mating electrical connector 106.

In an exemplary embodiment, the cable connector 130 is able to move relative to the connector holder 200 in a floating direction to accommodate misalignment of the mating electrical connector 106 and the cable connector 130. For example, the connector housing 132 of the cable connector 130 may move in the horizontal direction (X-direction) relative to the slider 310 to align the cable connector 130 with the mating electrical connector 106. The mounting lugs 136 are movable side-to-side within the slot 314 to accommodate the floating movement in the horizontal direction. The mounting lugs 136 may move side to side until the mounting lugs 136 and/or the connector housing 132 engage the first and second sides frame members 214, 216.

In an exemplary embodiment, the connector holder 200 may be movable relative to the cartridge 110 to accommodate misalignment between the cable connector 130 and the mating electrical connector 106. For example, the mounting features 224 holding the connector holder 200 to the panels 112 of the cartridge 110 may be movable relative to the panels 112. For example, the heads of the mounting features 224 may have a slight spacing between the interior of the heads of the mounting features 224 and the exterior surfaces of the panels 112 to allow a limited amount of side-to-side, floating movement in the horizontal direction.

Figure 9:
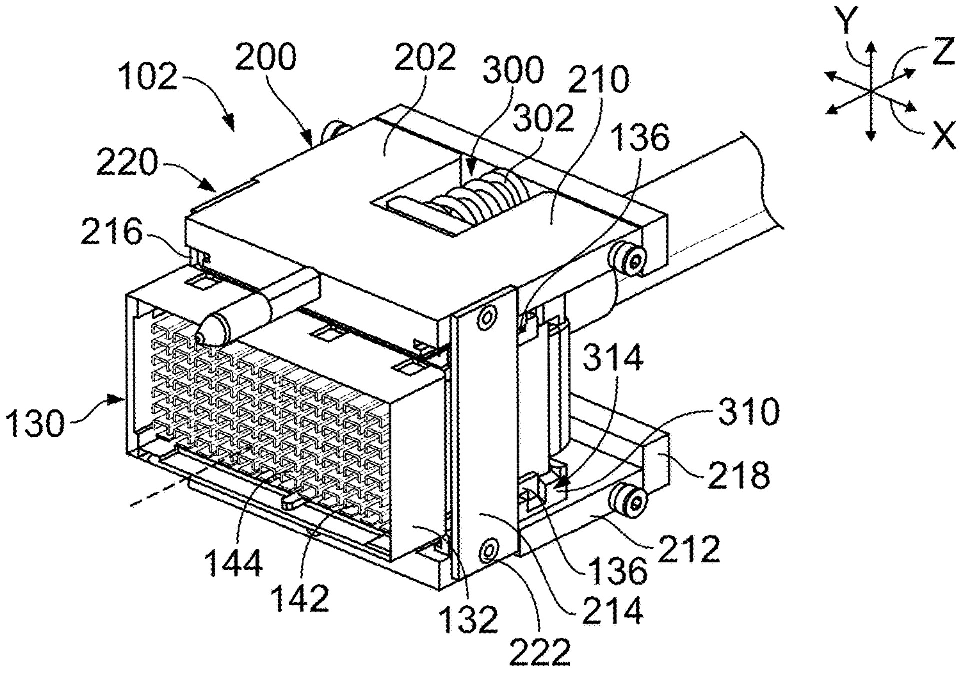
FIG. 9 is a front perspective view of the connector assembly in accordance with an exemplary embodiment.
Figure 10:
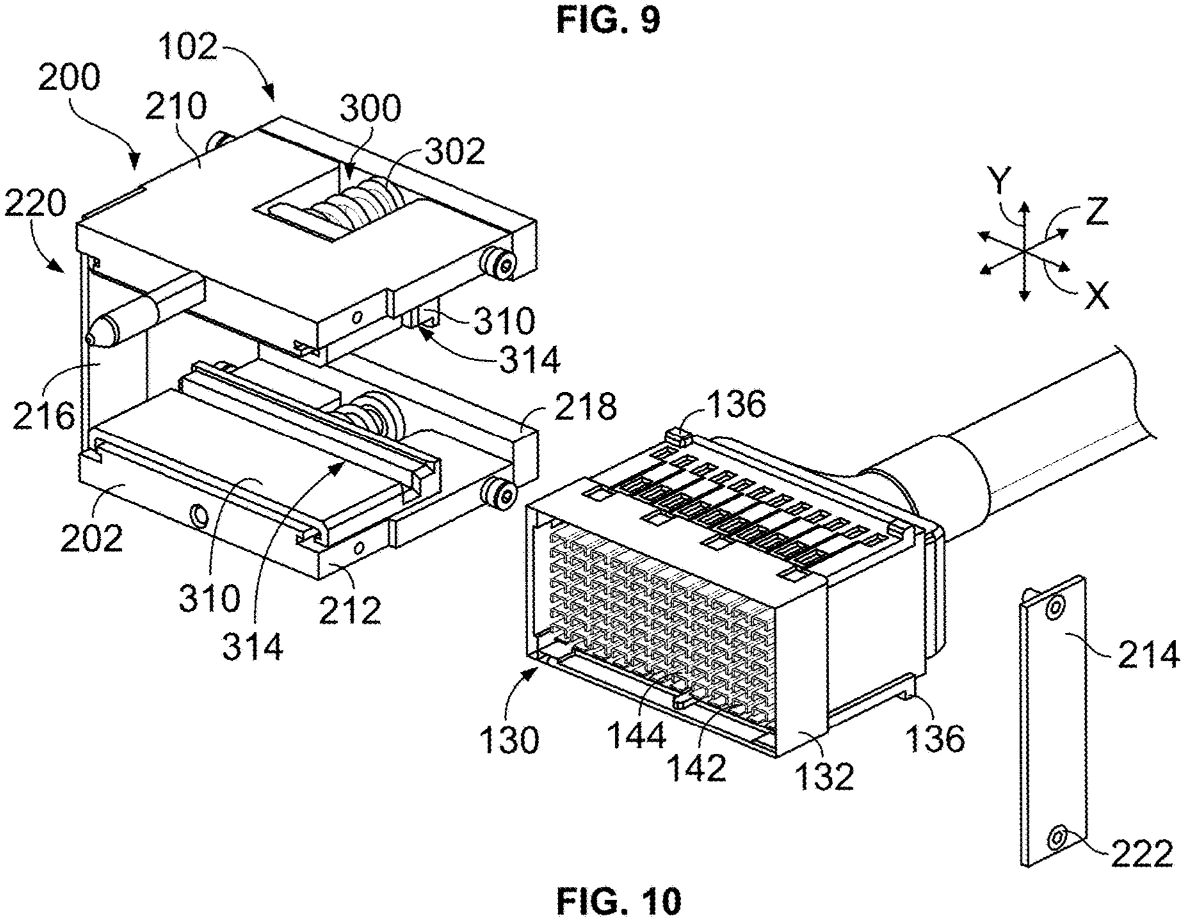
FIG. 10 is a front perspective, exploded view of the connector assembly\in accordance with an exemplary embodiment.
Figure 11:
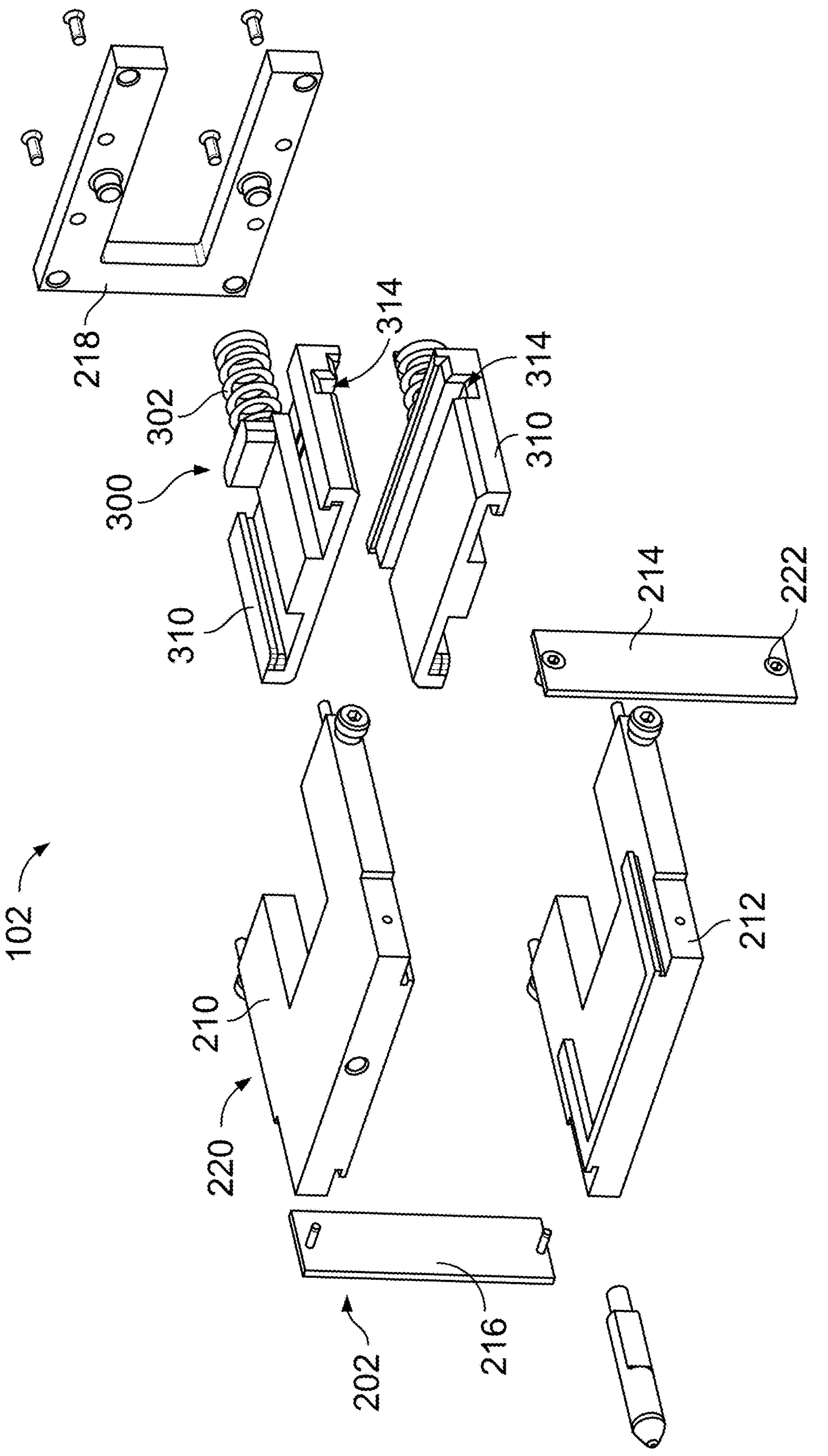
FIG. 11 is a front perspective, exploded view of a portion of the connector assembly with the cable connector removed to illustrate other components of the connector assembly in accordance with an exemplary embodiment.

FIG. 9 is a front perspective view of the connector assembly 102 in accordance with an exemplary embodiment. FIG. 10 is a front perspective, exploded view of the connector assembly 102 in accordance with an exemplary embodiment. FIG. 11 is a front perspective, exploded view of a portion of the connector assembly 102 with the cable connector 130 removed to illustrate other components of the connector assembly 102. The cable connector 130 shown in FIGS. 9 and 10 is a different sized cable connector than shown in FIGS. 4 and 5 having greater rows and columns of the signal contacts 142 and shields 144.

The connector assembly 102 includes the connector holder 200 used to hold the cable connector 130. The frame 202 of the connector holder 200 includes the upper frame member 210, the lower frame member 212, the first side frame member 214, the second side frame member 216, and the rear frame member 218. In the illustrated embodiment, the first side frame member 214 is separate and discrete from the upper and lower frame members 210, 212 and coupled thereto similar to the second side frame member 216 using fasteners 222 to form the brick 220.

The biasing assembly 300 is operably coupled between the cable connector 130 and the connector holder 200. The biasing assembly 300 allows the cable connector 130 to move relative to the connector holder 200. For example, the biasing assembly 300 allows the cable connector 130 to move along the mating axis 126 (Z-direction), such as to accommodate overtravel of the mating connector assembly 104 during mating. The biasing members 302 are coupled to the rear frame member 218 and the sliders 310. The sliders 310 are movable relative to the brick 220 and allow the cable connector 130 to move relative to the brick 220. The biasing members 302 forward bias the sliders 310 and thus the cable connector 130 relative to the rear frame member 218 and hold the cable connector 130 in a forward position for mating with the mating electrical connector 106. The mounting lugs 136 are received in the slots 314 to position the cable connector 130 relative to the sliders 310. The mounting lugs 136 are able to move side-to-side (X-direction) within the slots 314 to allow a limited amount of lateral floating movement of the cable connector 130 relative to the slider 310. The spacing between the sliders 310 may be slightly taller than the height of the connector housing 132 to allow a limited amount of vertical floating movement (Y-direction) of the cable connector 130 between the sliders 310.

Figure 12:
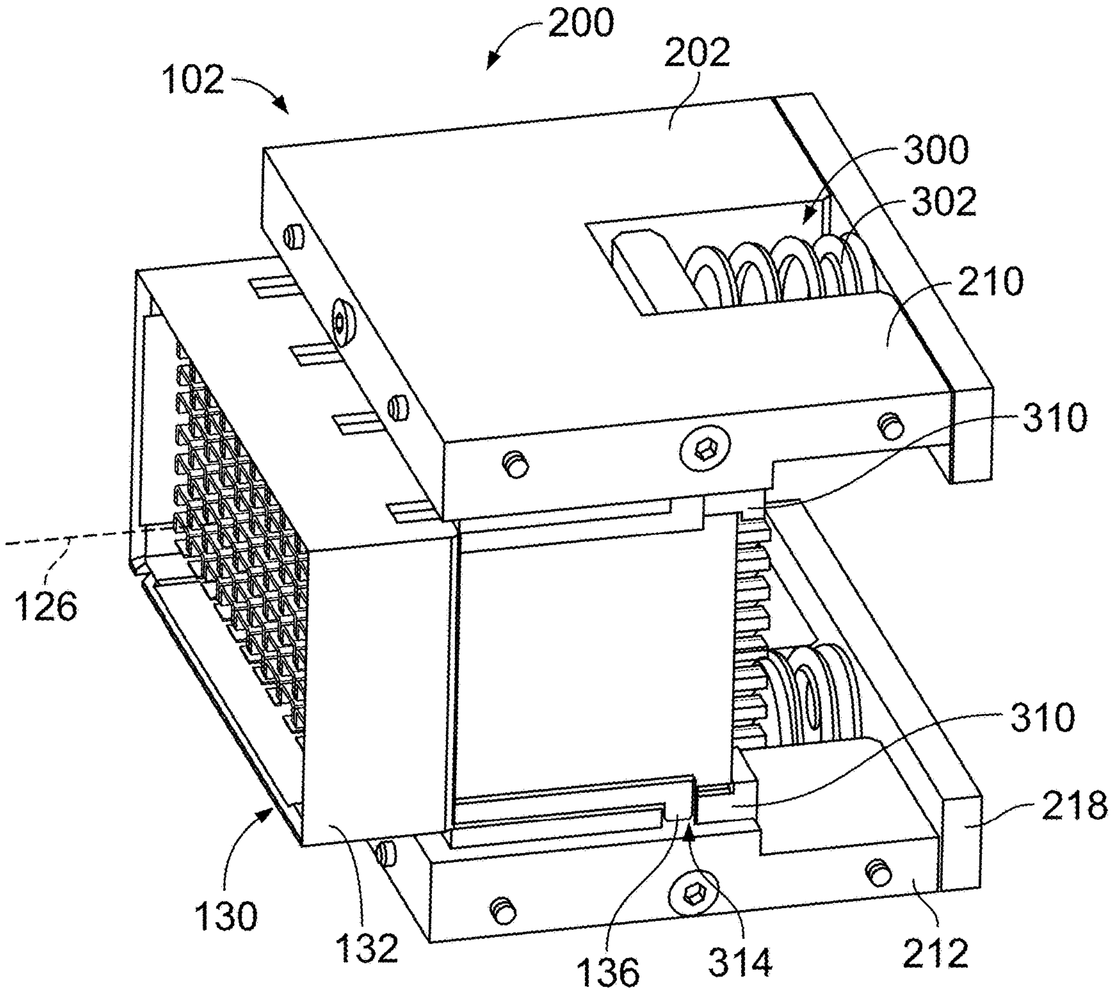
FIG. 12 is a front perspective view of the connector assembly in accordance with an exemplary embodiment.
Figure 13:
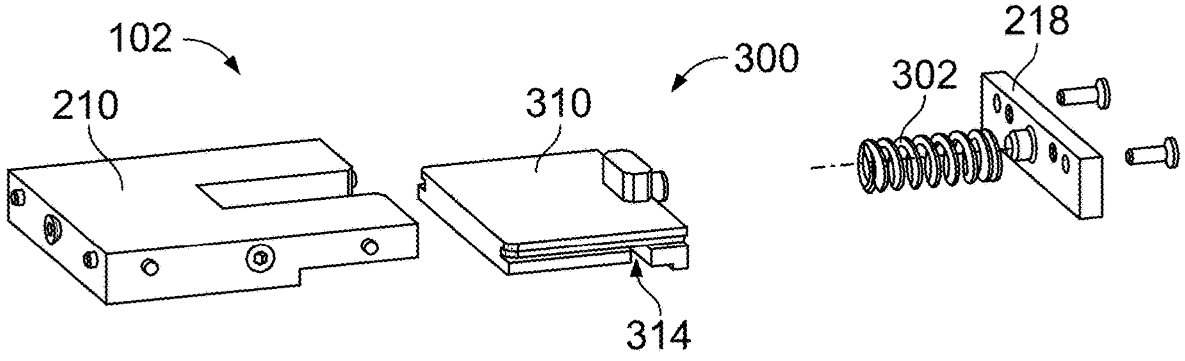
FIG. 13 is a front perspective, exploded view of a portion of the connector assembly in accordance with an exemplary embodiment.

FIG. 12 is a front perspective view of the connector assembly 102 in accordance with an exemplary embodiment. FIG. 13 is a front perspective, exploded view of a portion of the connector assembly 102. The connector assembly 102 includes the connector holder 200 used to hold the cable connector 130. The frame 202 of the connector holder 200 includes the upper frame member 210, the lower frame member 212, and the rear frame member 218. In the illustrated embodiment, the frame 202 is provided without first and second side frame members. Rather, the upper and lower frame members 210, 212 are configured to be coupled directly to the panels of the cartridge. As such, the panels of the cartridge function as the first and second side frame members.

The biasing assembly 300 is operably coupled between the cable connector 130 and the connector holder 200. The biasing assembly 300 allows the cable connector 130 to move relative to the connector holder 200. For example, the biasing assembly 300 allows the cable connector 130 to move along the mating axis 126 (Z-direction), such as to accommodate overtravel of the mating connector assembly 104 during mating. The biasing members 302 are coupled to the rear frame member 218 and the sliders 310. The sliders 310 are movable relative to the frame members and allow the cable connector 130 to move relative to the frame members. The biasing members 302 forward bias the sliders 310 and thus the cable connector 130 relative to the rear frame member 218 and hold the cable connector 130 in a forward position for mating with the mating electrical connector 106. The mounting lugs 136 are received in the slots 314 to position the cable connector 130 relative to the sliders 310. The mounting lugs 136 are able to move side-to-side (X-direction) within the slots 314 to allow a limited amount of lateral floating movement of the cable connector 130 relative to the slider 310. The spacing between the sliders 310 may be slightly taller than the height of the connector housing 132 to allow a limited amount of vertical floating movement (Y-direction) of the cable connector 130 between the sliders 310.

Figure 15:
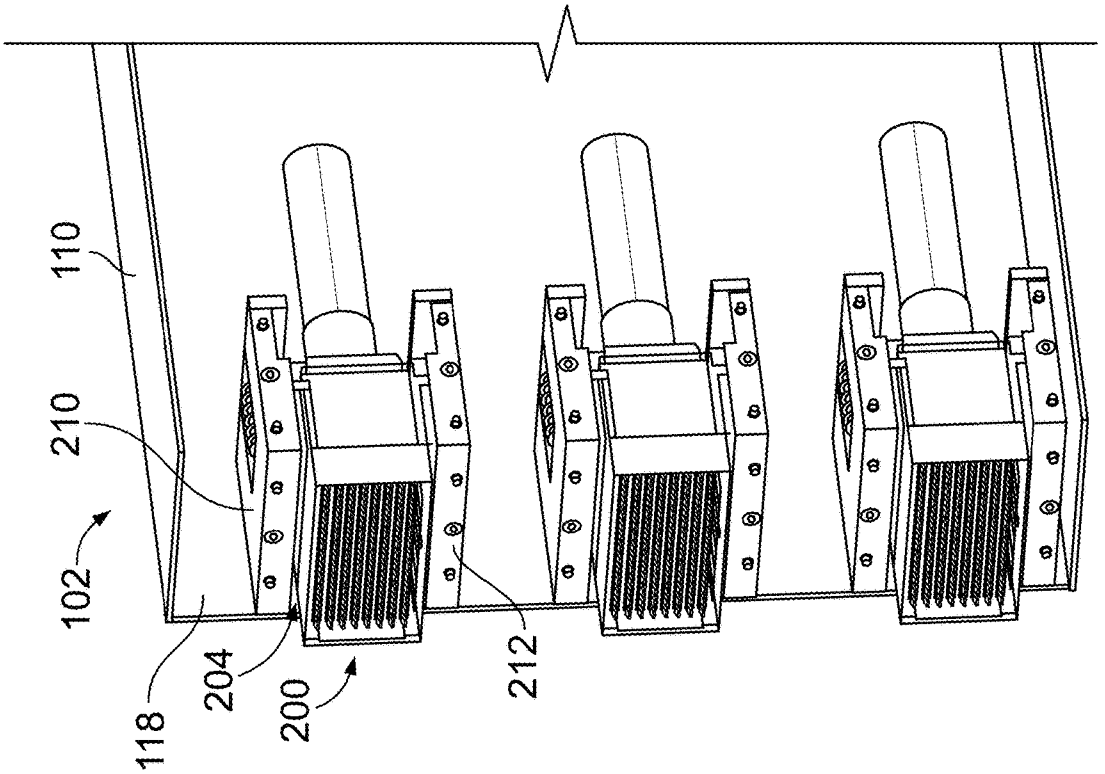
FIG. 15 is a front perspective, assembled view of a portion of the connector assembly in accordance with an exemplary embodiment.
Figure 14:
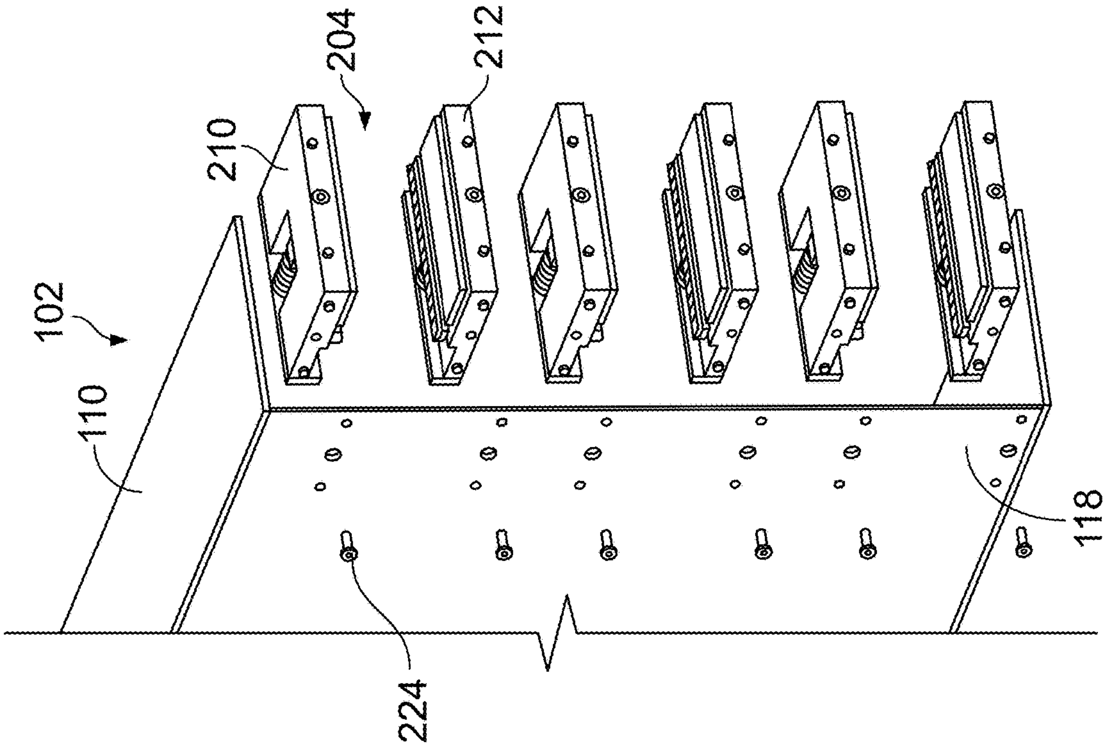
FIG. 14 is a front perspective, exploded view of the connector assembly in accordance with an exemplary embodiment.

FIG. 14 is a front perspective, exploded view of the connector assembly 102 in accordance with an exemplary embodiment. FIG. 15 is a front perspective, assembled view of a portion of the connector assembly 102. During assembly, the upper and lower frame members 210, 212 are coupled to the first side panel 116 of the cartridge 110 using the mounting features 224, such as threaded fasteners. The upper and lower frame members 210, 212 may include locating posts 138 extending from the sides thereof that are received in openings in the first side panel 116 to orient the upper and lower frame members 210, 212 relative to the first side panel 116. After the frame members 210, 212 are secured to the first side panel 116, the cable connector 130 may be loaded into the connector chamber 204 between the frame members 210, 212, such as being side loaded into the connector chamber 204. The second side panel 118 of the cartridge 110 may be coupled to the second sides of the connector holders 200 after the cable connectors 130 are positioned in the connector chambers 204.

Figure 16:
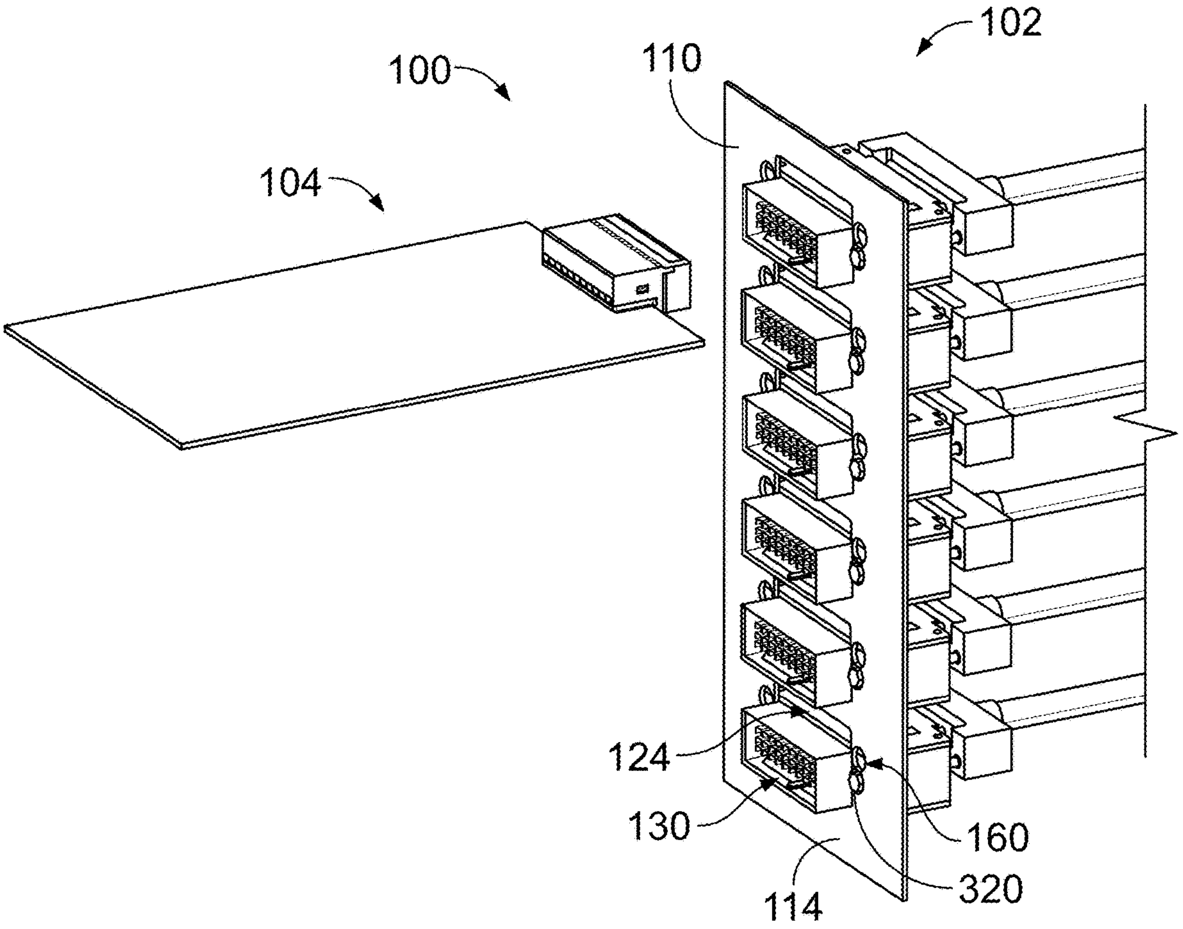
FIG. 16 is a perspective view of a portion of the communication system showing one of the mating connector assemblies poised for coupling to the corresponding connector assembly in accordance with an exemplary embodiment.

FIG. 16 is a perspective view of a portion of the communication system 100 showing one of the mating connector assemblies 104 poised for coupling to the corresponding connector assembly 102. A plurality of the connector assemblies 102 are coupled to the cartridge 110. In an exemplary embodiment, the connector assemblies 102 are coupled to the front panel 114 of the cartridge 110. The cable connectors 130 pass through the openings 124. In an exemplary embodiment, the front panel 114 includes mounting openings 160 for mounting the connector assemblies 102 and the front panel 114. The connector assemblies 102 include panel mounts 320 configured to be received in the mounting openings 160 to secure the connector assemblies 102 to the front panel 114. The cable connectors 130 are movable relative to the front panel 114 and the panel mounts 320 to align for mating and to compress during overtravel of the mating connector assembly 104.

Figure 17:
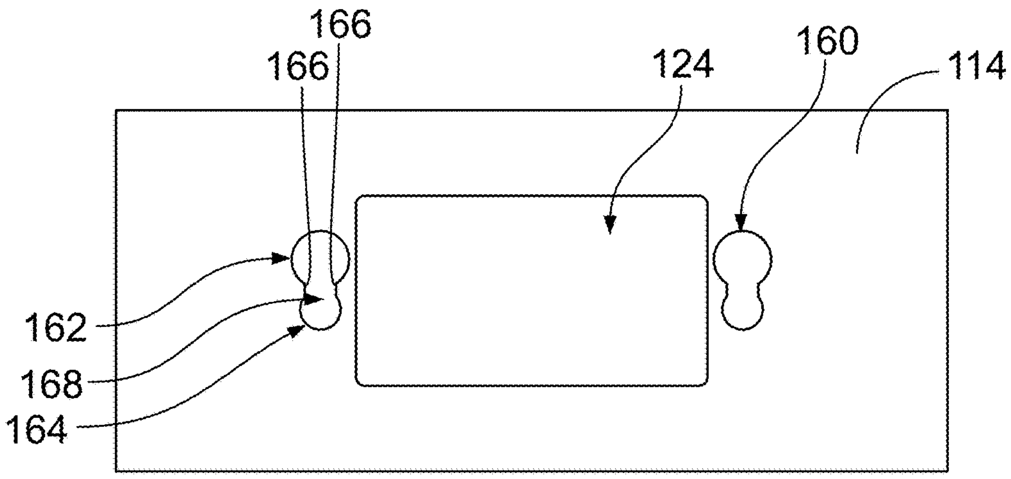
FIG. 17 is a front view of a portion of the front panel showing one of the openings and the corresponding mounting openings in accordance with an exemplary embodiment.

FIG. 17 is a front view of a portion of the front panel 114 showing one of the openings 124 and the corresponding mounting openings 160. The mounting openings 160 flank both sides of the opening 124. Each mounting opening 160 includes a large opening 162, a small opening 164, and flanges 166 between the large opening 162 and the small opening 164 on opposite sides of a channel 168 that connects the large opening 162 and the small opening 164. The channel 168 has a smaller width than the large opening 162 and the small opening 164. The large opening 162 may have a first diameter and the small opening 164 may have a second diameter smaller than the first diameter. The large opening 162 is large enough to receive the panel mount 320 (FIG. 16) from behind. The small opening 164 is smaller than the panel mount 320 to prevent pull out of the panel mount 320. The flanges 166 prevent the panel mount 320 from moving from the small opening 164 to the large opening 162 and thus retain the panel mount 320 in the small opening 164.

Figure 18:
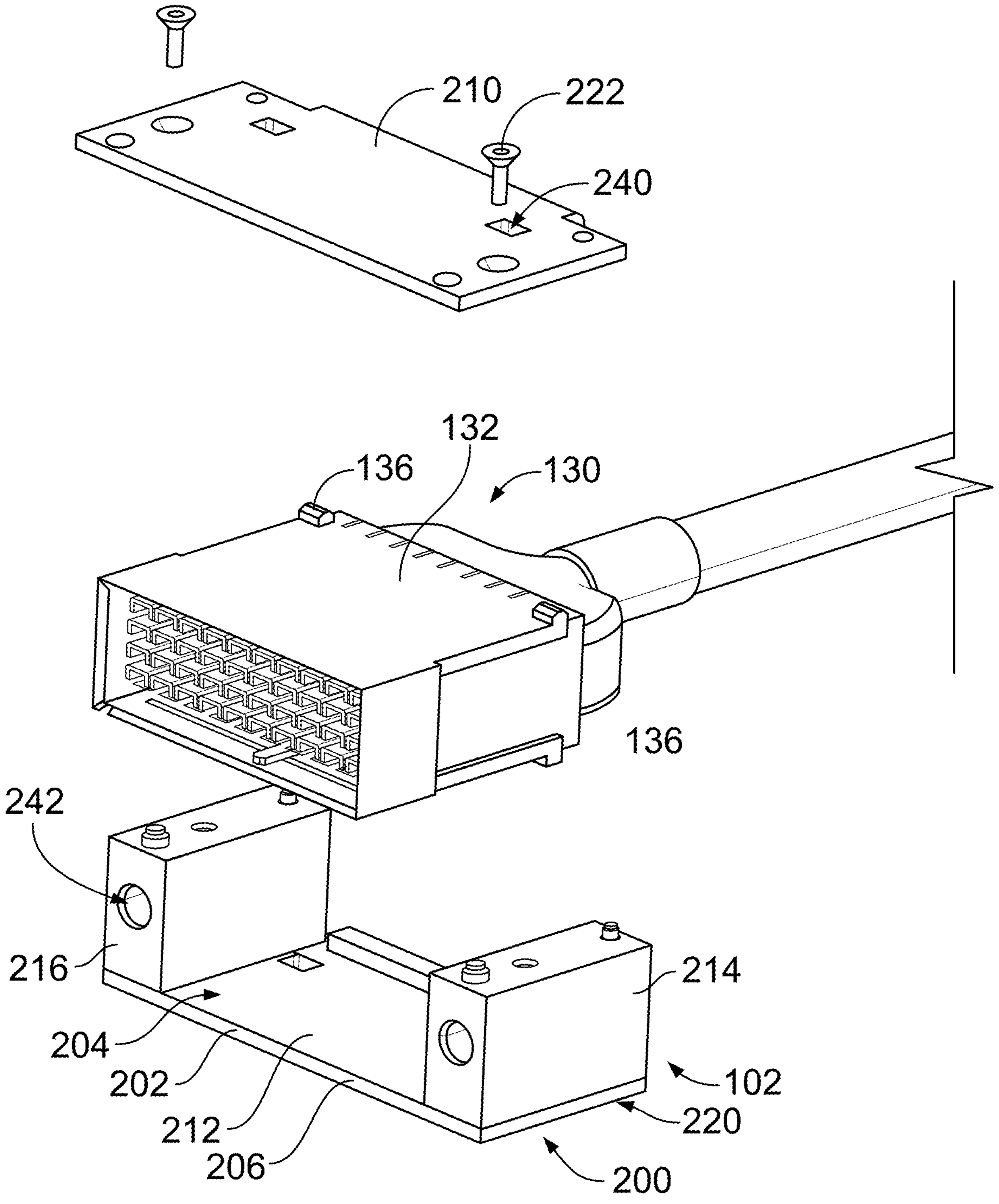
FIG. 18 is a front perspective, exploded view of a portion of the connector assembly in accordance with an exemplary embodiment.
Figure 19:
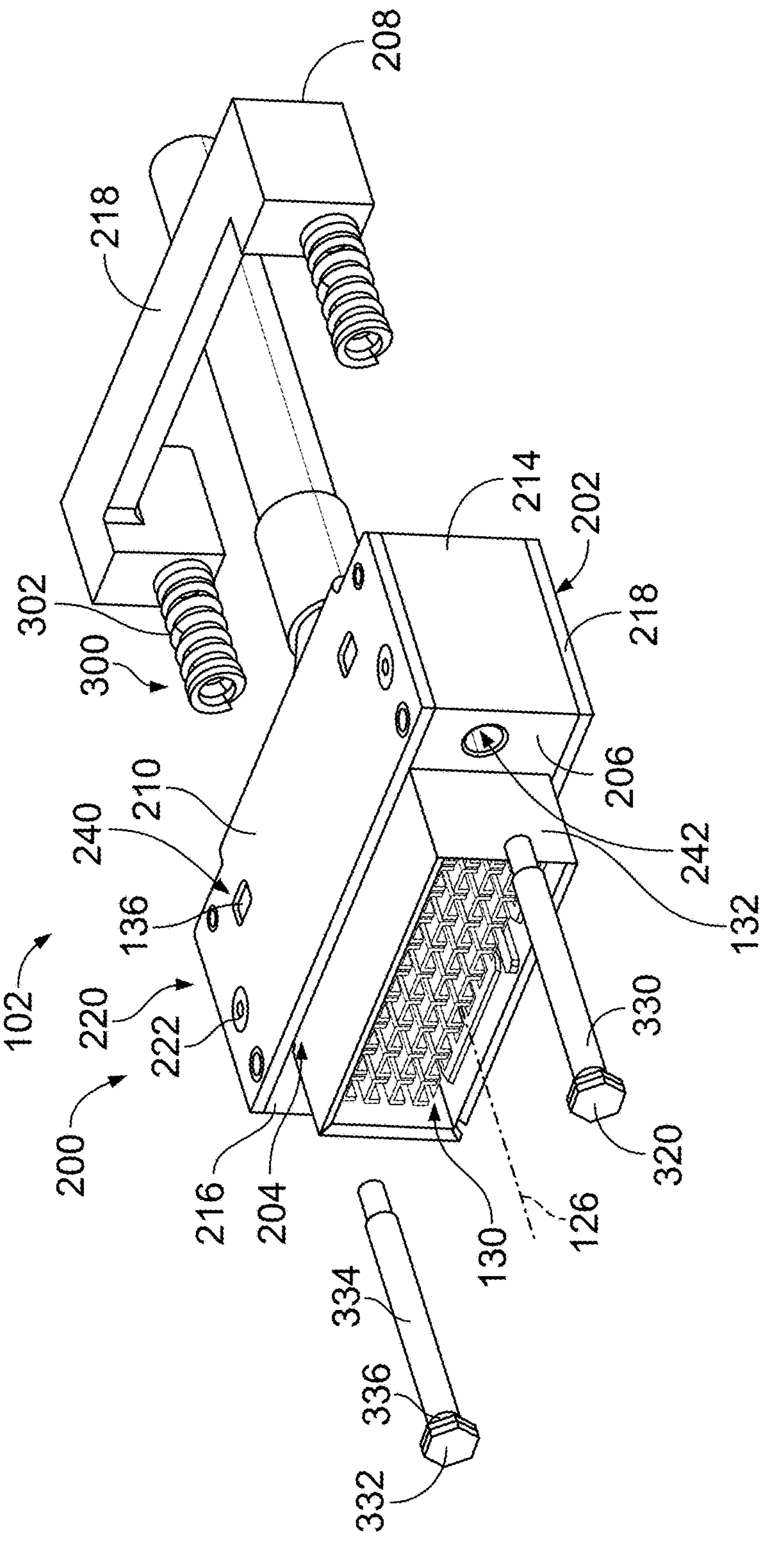
FIG. 19 is a front perspective, exploded view of the connector assembly in accordance with an exemplary embodiment.

FIG. 18 is a front perspective, exploded view of a portion of the connector assembly 102 in accordance with an exemplary embodiment. FIG. 19 is a front perspective, exploded view of the connector assembly 102.

The connector assembly 102 includes the connector holder 200 used to hold the cable connector 130. The connector holder 200 is configured to be coupled to the cartridge 110 (FIG. 16) to position the cable connector 130 relative to the cartridge 110. The connector holder 200 includes the frame 202 defining the connector chamber 204. The cable connector 130 is received in the connector chamber 204. The frame 202 extends between the front 206 and the rear 208 (FIG. 19) of the connector holder 200.

In an exemplary embodiment, the frame 202 includes the upper frame member 210, the lower frame member 212, the first side frame member 214, the second side frame member 216, and the rear frame member 218 (FIG. 19). The upper frame member 210 and the lower frame member 212 are coupled to the first side frame member 214 and the second side frame member 216 using the fasteners 222. The upper frame member 210, the lower frame member 212, the first side frame member 214, and the second side frame member 216 form the brick 220 used to hold the cable connector 130. The rear frame member 218 is located rearward of the brick 220 and may be spaced apart from the brick 220.

In an exemplary embodiment, the upper and lower frame members 210, 212 include slots 240 that receive the mounting lugs 136 extending from the connector housing 132. The slots 240 position the connector housing 132 within the connector chamber 204. In an exemplary embodiment, the slots 240 are oversized relative to the mounting lugs 136 to allow a limited amount of floating movement of the cable connector 130 within the connector chamber 204. For example, the mounting lugs 136 may move laterally (X-direction). The mounting lugs 136 may move in the mating direction (Z-direction). In an exemplary embodiment, the upper and lower frame members 210, 212 may have a spacing therebetween to receive the cable connector 130. The spacing may be slightly taller than the height of the connector housing 132 to allow a limited amount of floating movement of the cable connector 130 between the upper and lower frame members 210, 212. As such, the connector housing 132 is movable in the Y-direction relative to the upper and lower frame members 210, 212. The spacing between the upper and lower frame members 210, 212 limits the amount of floating movement to a confined amount (for example, 1.0 mm).

In an exemplary embodiment, the first and second side frame members 214, 216 include channels 242 that receive sliders 330 of the biasing assembly 300. The channels 242 extend between front and rear ends of the side frame members 214, 216. In an exemplary embodiment, the first and second side frame members 214, 216 are configured to slide along the sliders 330. The panel mounts 320 are provided at the front ends of the sliders 330. The rear ends of the sliders 330 are configured to be coupled to the rear frame member 218. For example, the rear ends of the sliders 330 may be threadably coupled to the front face of the rear frame member 218. The panel mounts 320 are fixed relative to the rear frame member 218. The first and second side frame members 214, 216 are movable between the panel mounts 320 and the rear frame member 218.

In an exemplary embodiment, the connector assembly 102 includes the biasing assembly 300 (FIG. 19) operably coupled between the cable connector 130 and the connector holder 200. The biasing assembly 300 allows the cable connector 130 to move relative to the rear frame member 218 of the connector holder 200. For example, the biasing assembly 300 allows the cable connector 130 to move along the mating axis 126 (Z-direction), such as to accommodate overtravel of the mating connector assembly 104 during mating. In an exemplary embodiment, the biasing assembly 300 includes the biasing members 302. Rear ends of the biasing members 302 are coupled to the rear frame member 218. The front ends of the biasing members 302 are coupled to the first and second side frame members 214, 216. The biasing members 302 forward bias the first and second side frame members 214, 216, and thus the brick 220 in a forward biasing direction. As such, the cable connector 130 is forward biased by the biasing members 302. The biasing members 302 hold the brick 220 and the cable connector 130 in a forward position for mating with the mating electrical connector 106. The biasing members 302 are compressible in the rearward compression direction to allow movement of the brick 220, and thus the cable connector 130, to a rearward position during mating with the mating connector assembly 104. The sliders 330 guide movement of the brick 220 to limit movement parallel to the mating axis (Z-direction).

In an exemplary embodiment, each slider 330 includes a head 332 and a shaft 334 extending from the head 332. A lip 336 may extend around the shaft 334 proximate to the head 332. For example, the lip 336 may be located immediately rearward of the head 332. The lip 336 has a larger diameter than the shaft 334. The shaft 334 and the lip 336 both have smaller diameters than the head 332. The shaft 334 is received in the corresponding channel 242 of the side frame member 214, 216. Optionally, the channel 242 may be oversized relative to the shaft 334 to allow a limited amount of floating movement of the side frame member 214, 216 relative to the shaft 334. The floating movement allows the cable connector 130 to move relative to the slider 330 and thus move relative to the cartridge 110 to align the cable connector 130 with the mating electrical connector 106 during mating.

Figure 20:
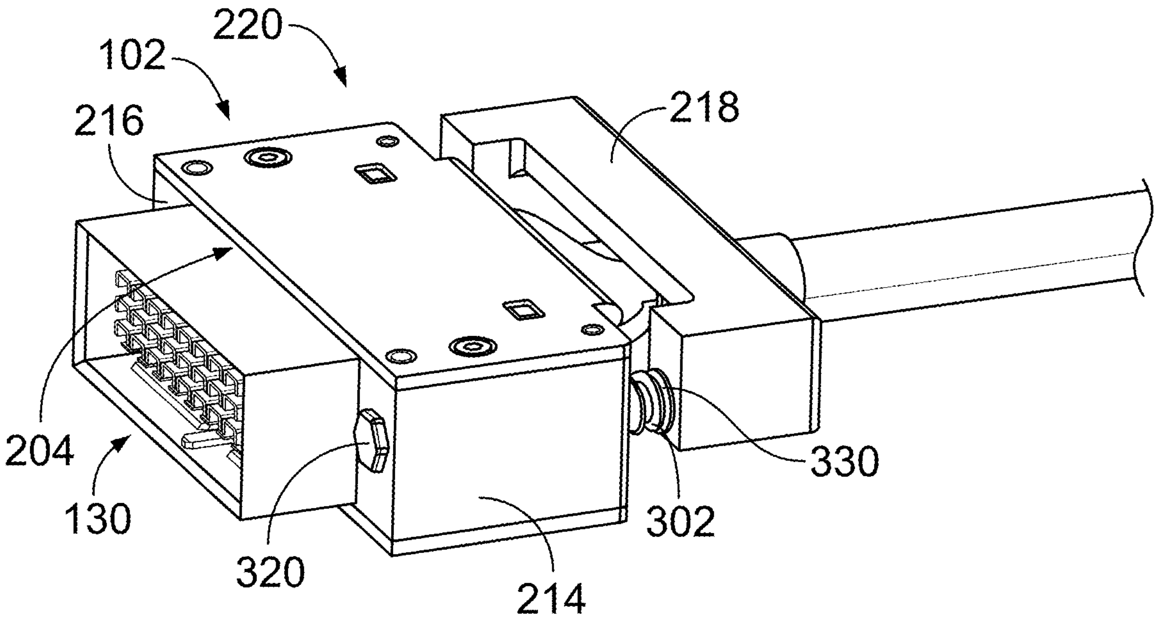
FIG. 20 is a front perspective, assembled view of the connector assembly in accordance with an exemplary embodiment showing the brick and the cable connector in a forward position.
Figure 21:
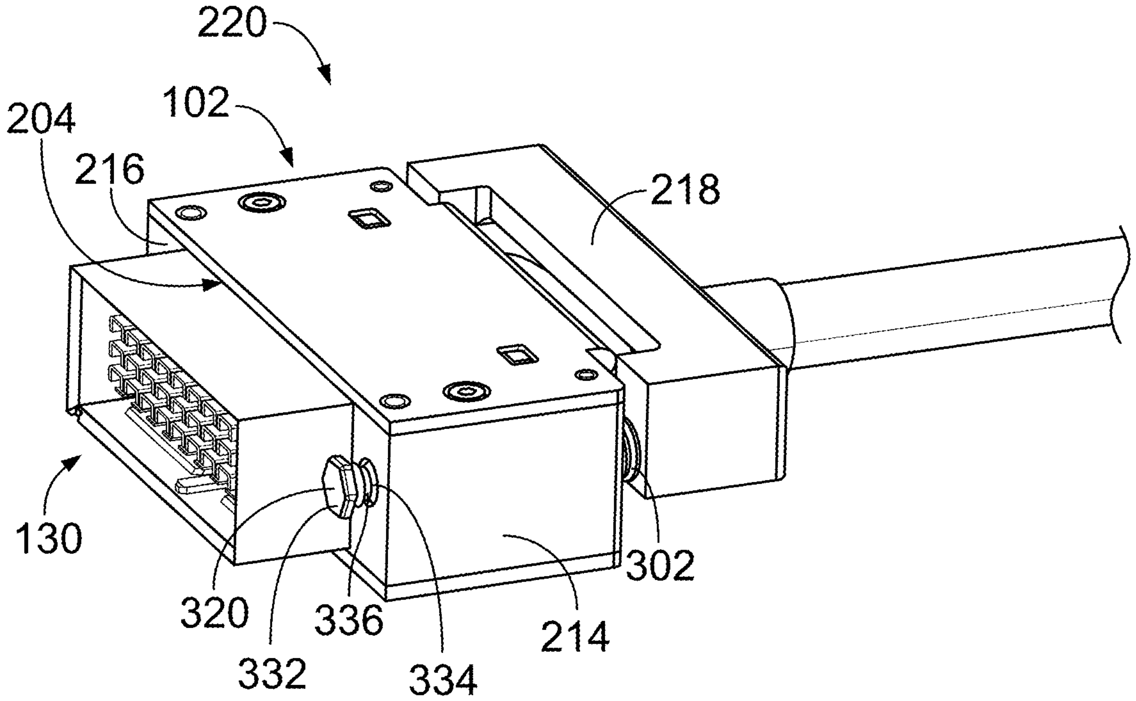
FIG. 21 is a front perspective, assembled view of the connector assembly in accordance with an exemplary embodiment showing the brick and the cable connector in a rearward position.

FIG. 20 is a front perspective, assembled view of the connector assembly 102 in accordance with an exemplary embodiment showing the brick 220 and the cable connector 130 in a forward position. FIG. 21 is a front perspective, assembled view of the connector assembly 102 in accordance with an exemplary embodiment showing the brick 220 and the cable connector 130 in a rearward position.

When assembled, the cable connector 130 is received in the connector chamber 204 and held by the brick 220. The sliders 330 pass through the side frame members 214, 216 and are coupled to the rear frame member 218. The panel mount 320 at the front end of each slider 330 is located forward of the corresponding side frame member 214, 216. The biasing members 302 forward bias the brick 220, and thus the cable connector 130, relative to the rear frame member 218 to the forward position (FIG. 20). During assembly to the cartridge 110, the brick 220 and the cable connector 130 may be shifted rearward by compressing the biasing members 302 and moving the brick 220 and the cable connector 130 to the rearward position (FIG. 21). A portion of the shaft 334, the lip 336, and the head 332, defining the panel mount 320, are exposed forward of the side frame members 214, 216 in the rearward position. The panel mount 320 is configured to be coupled to the cartridge 110 when the brick 220 and the cable connector 130 are moved to the rearward position.

Figure 22:
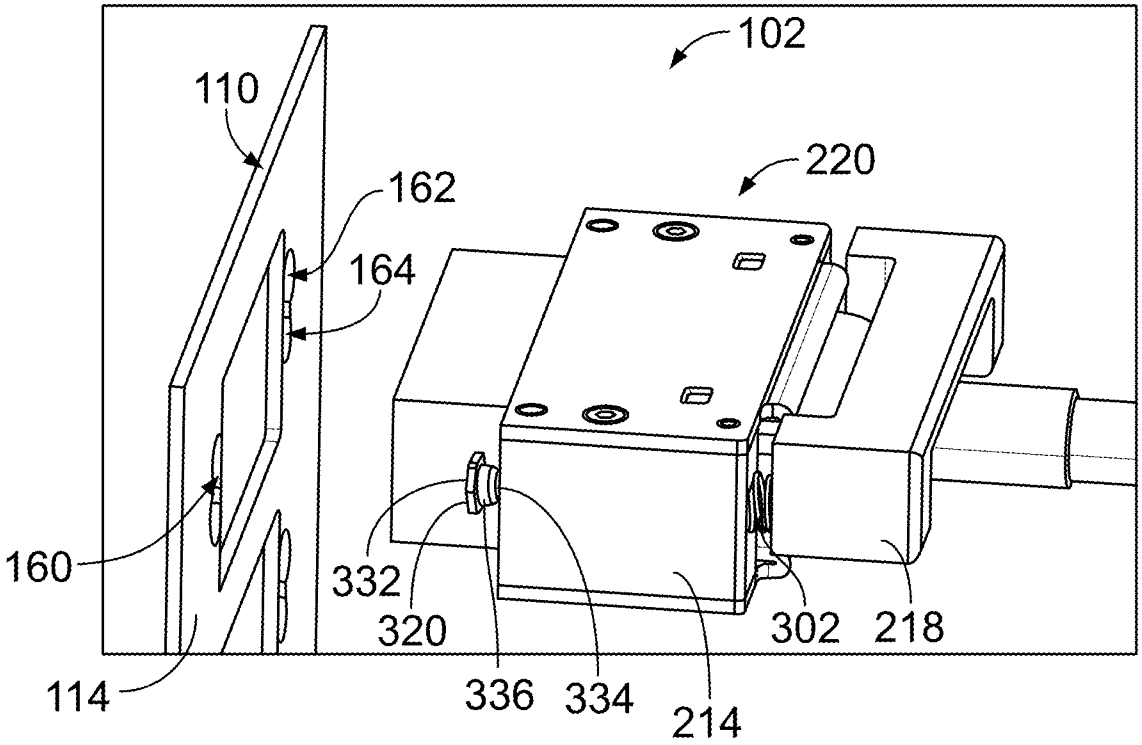
FIG. 22 is a rear perspective view of the connector assembly poised for coupling to the front panel of the cartridge in accordance with an exemplary embodiment.
Figure 23:
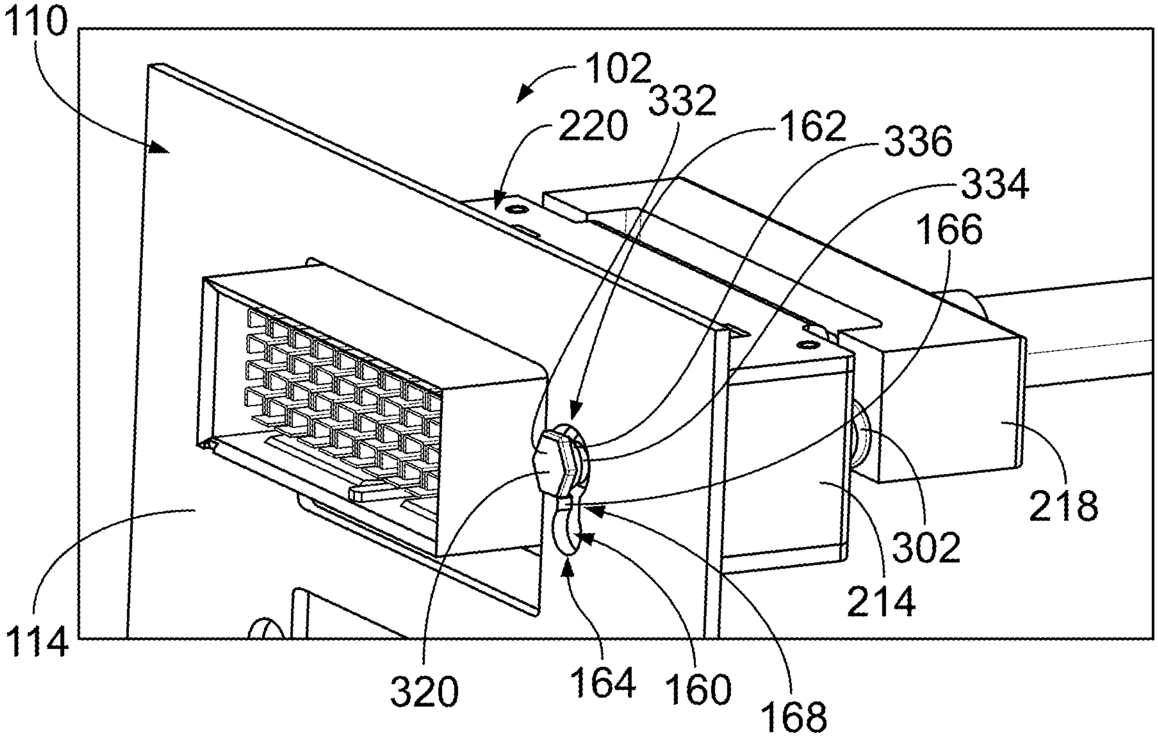
FIG. 23 is a front perspective view of the connector assembly partially coupled to the front panel of the cartridge in accordance with an exemplary embodiment.
Figure 24:
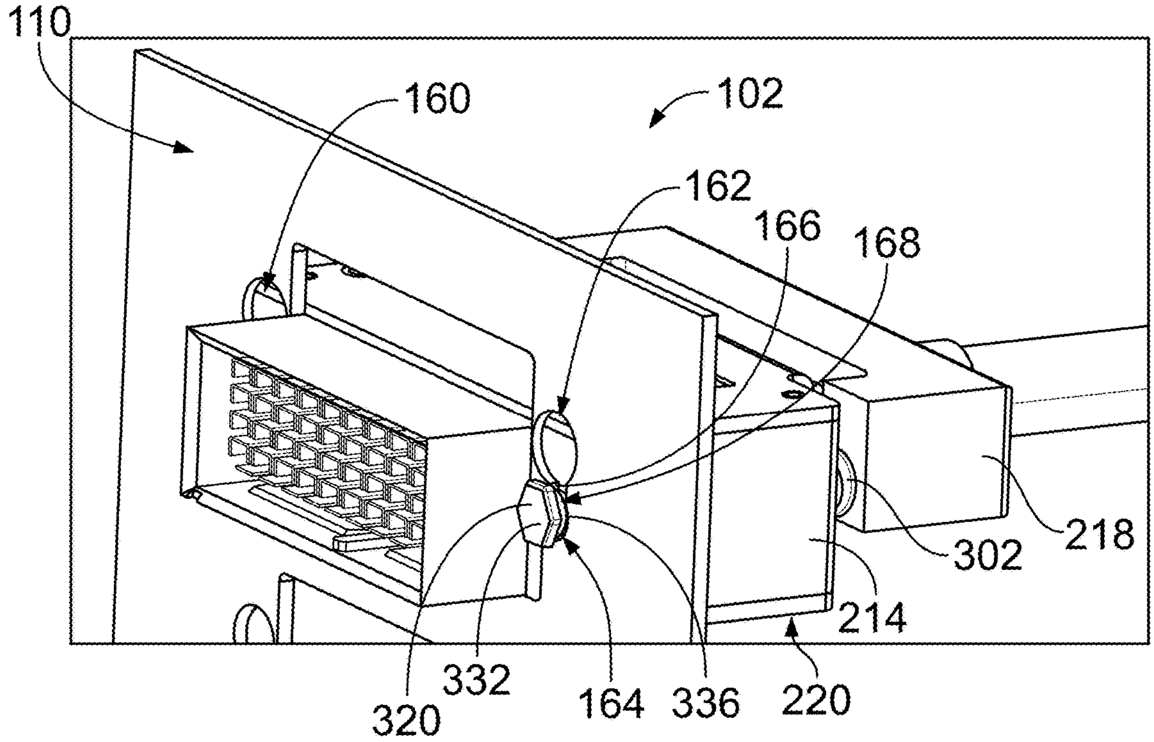
FIG. 24 is a front perspective view of the connector assembly coupled to the front panel of the cartridge in accordance with an exemplary embodiment.
Figure 25:
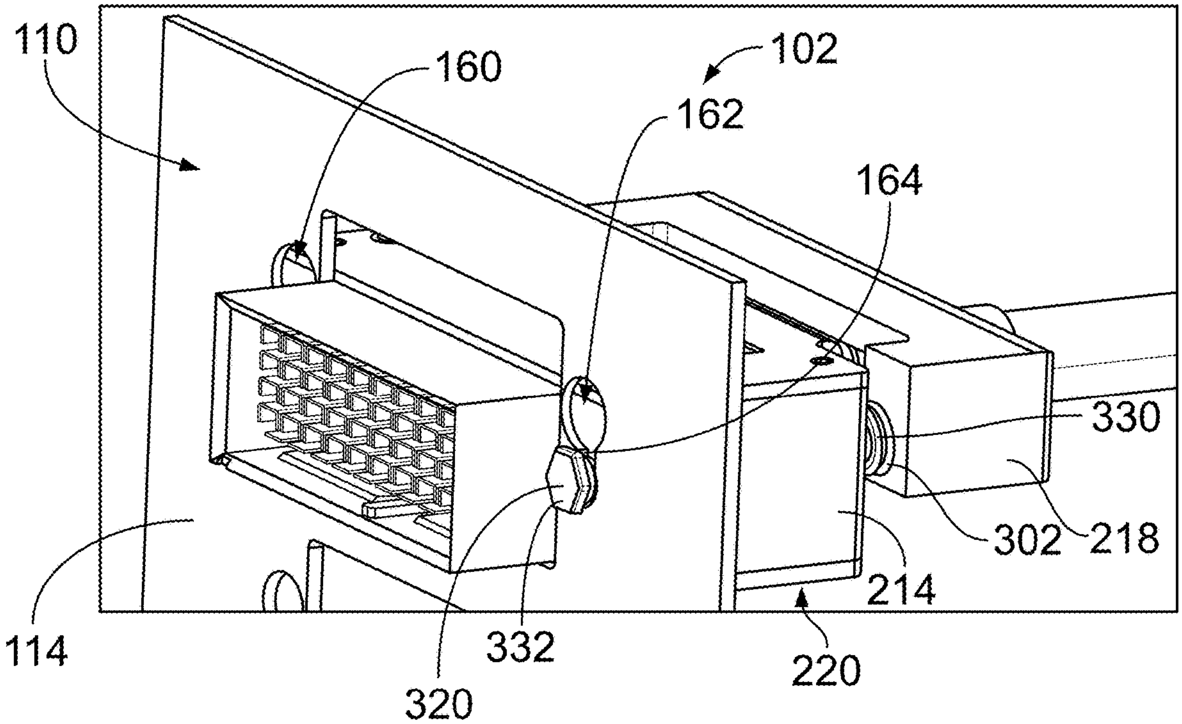
FIG. 25 is a front perspective view of the connector assembly locked to the front panel of the cartridge in accordance with an exemplary embodiment.

FIG. 22 is a rear perspective view of the connector assembly 102 poised for coupling to the front panel 114 of the cartridge 110 in accordance with an exemplary embodiment. FIG. 23 is a front perspective view of the connector assembly 102 partially coupled to the front panel of the cartridge 110 in accordance with an exemplary embodiment. FIG. 24 is a front perspective view of the connector assembly 102 coupled to the front panel of the cartridge 110 in accordance with an exemplary embodiment. FIG. 25 is a front perspective view of the connector assembly 102 locked to the front panel of the cartridge 110 in accordance with an exemplary embodiment.

During assembly, the connector assembly 102 is coupled to the front panel 114 from behind the front panel 114. The brick 220 is held in the rearward position to expose the panel mount 320 forward of the side frame members 214, 216. The panel mounts 320 are aligned with the mounting openings 160 (FIG. 22). The head 332 of each slider 330 passes through the large opening 162 (FIG. 23). The panel mount 320 is then shifted downward bypassing the shaft 334 through the channel 168 into the small opening 164 (FIG. 24). Both the head 332 and the lip 336 have diameters that are larger than the width of the channel 168. The diameter of the shaft 334 is smaller than the width of the channel 168 allowing the shaft 334 to pass through the channel 168 between the large opening 162 and the small opening 164. Once positioned in the small opening 164, the brick 220 is released and the biasing members 302 forward bias the brick 220 against the rear surface of the front panel 114 (FIG. 24). Such action presses the sliders 330 and the rear frame member 218 in a rearward direction to press the head 332 against the front surface of the front panel 114. The lip 336 is moved into the small opening 164. With the lip 336 in the small opening 164, the flanges 166 restrict the panel mount 320 from moving in an upward direction from the small opening 164 to the large opening 162. The panel mount 320 is captured in the small opening 164 and the connector assembly 102 is securely couple to the front panel 114. The connector assembly 102 is locked in place on the front panel 114. The connector assembly 102 is unable to be removed from the front panel 114 until the sliders 330 are moved forward to align the shaft 334 with the channel 168.

Figure 26:
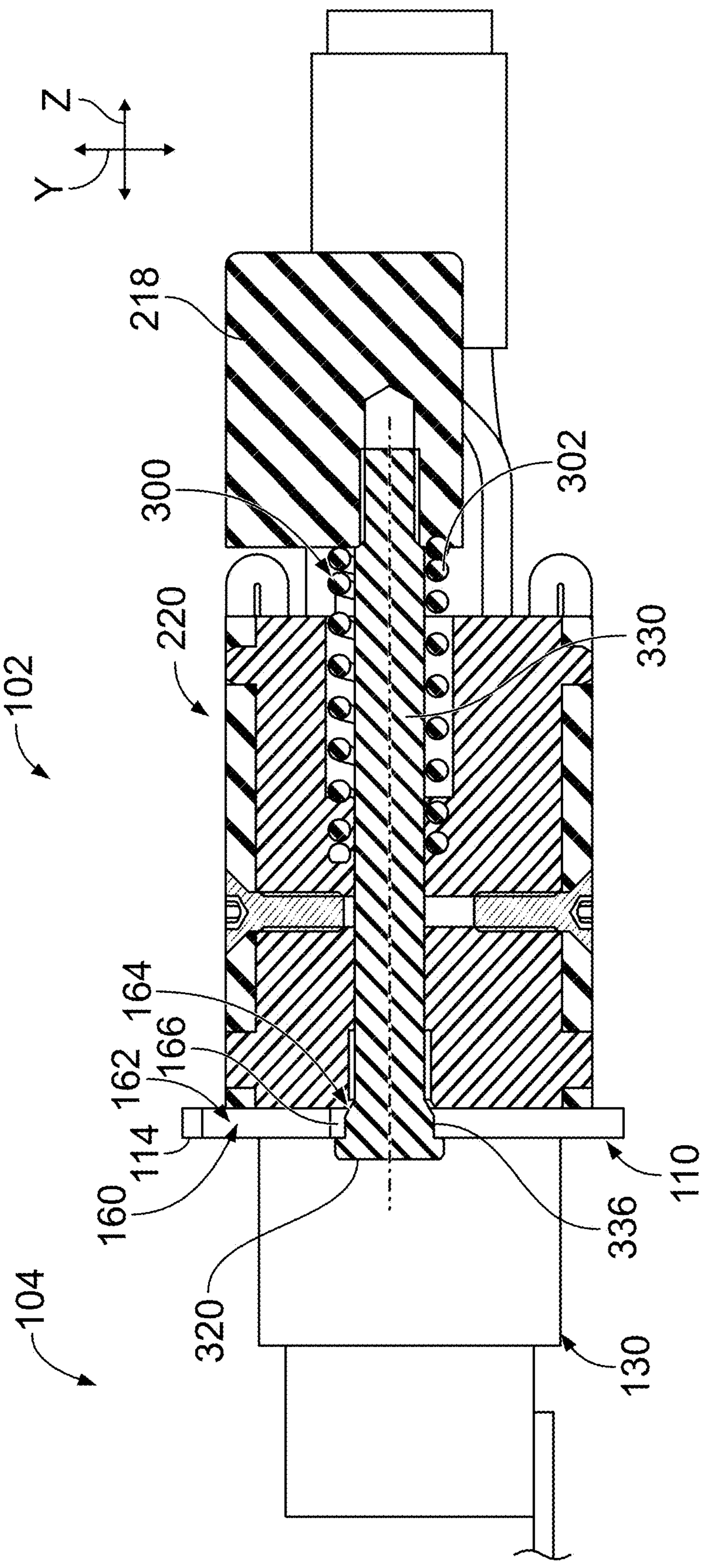
FIG. 26 is a cross-sectional view of the connector assembly coupled to the cartridge in accordance with an exemplary embodiment.

FIG. 26 is a cross-sectional view of the connector assembly 102 coupled to the cartridge 110 in accordance with an exemplary embodiment. The panel mount 320 is received in the mounting opening 160 and locked to the front panel 114. The lip 336 is located in the small opening 164. The flange 166 is located above the lip 336 and prevents the slider 330 from moving upward to the large opening 162.

During mating with the mating connector assembly 104, loading of the mating connector assembly 104 in the mating direction may cause compression of the biasing assembly 300. For example, the biasing members 302 may be compressed when the preload spring force is overcome. The brick 220 and the cable connector 130 are allowed to move rearward along the sliders 330 to compress the biasing members 302 in the rearward compression direction to accommodate the overloading of the mating connector assembly 104. The brick 220 and the cable connector 130 are moved in the rearward direction toward the rear frame member 218. The sliders 330 hold the rear frame member 218 in a fixed location relative to the front panel 114.

Figure 27:
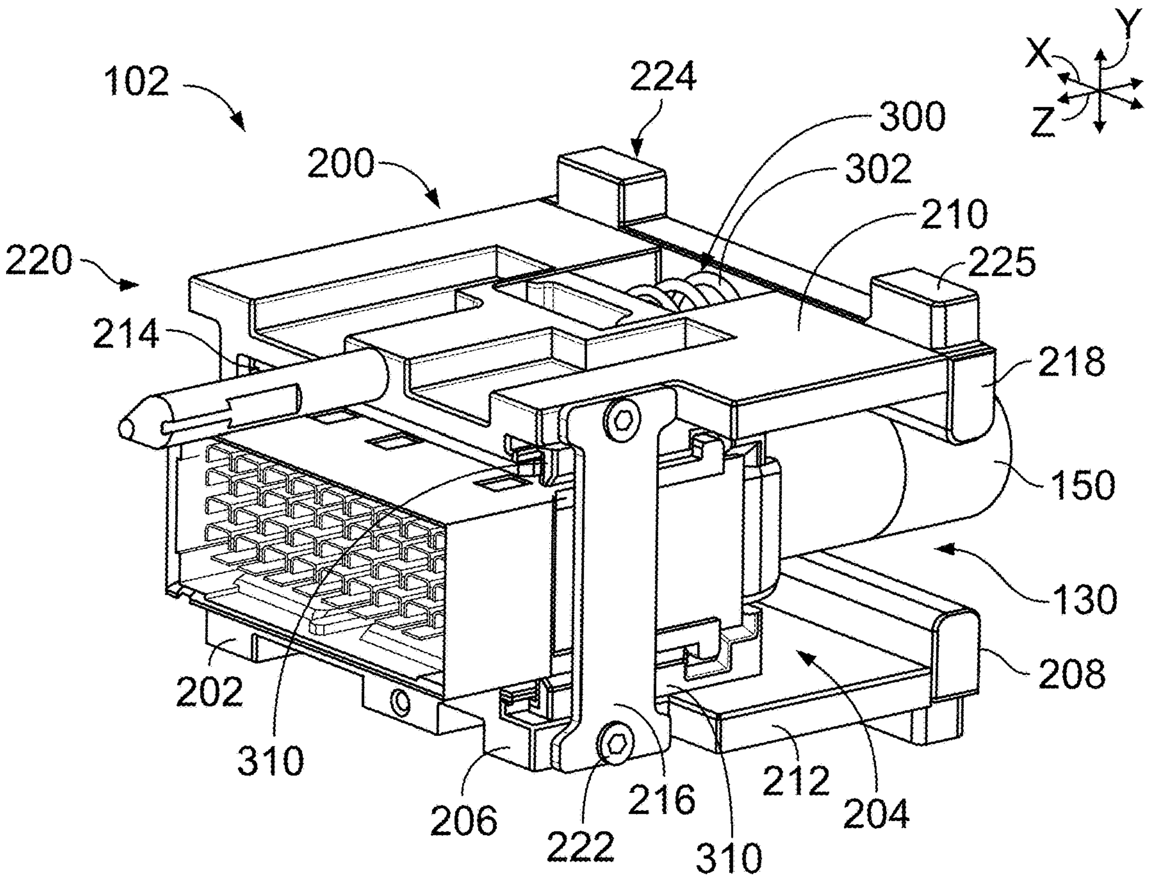
FIG. 27 is a front perspective view of the connector assembly in accordance with an exemplary embodiment.
Figure 28:
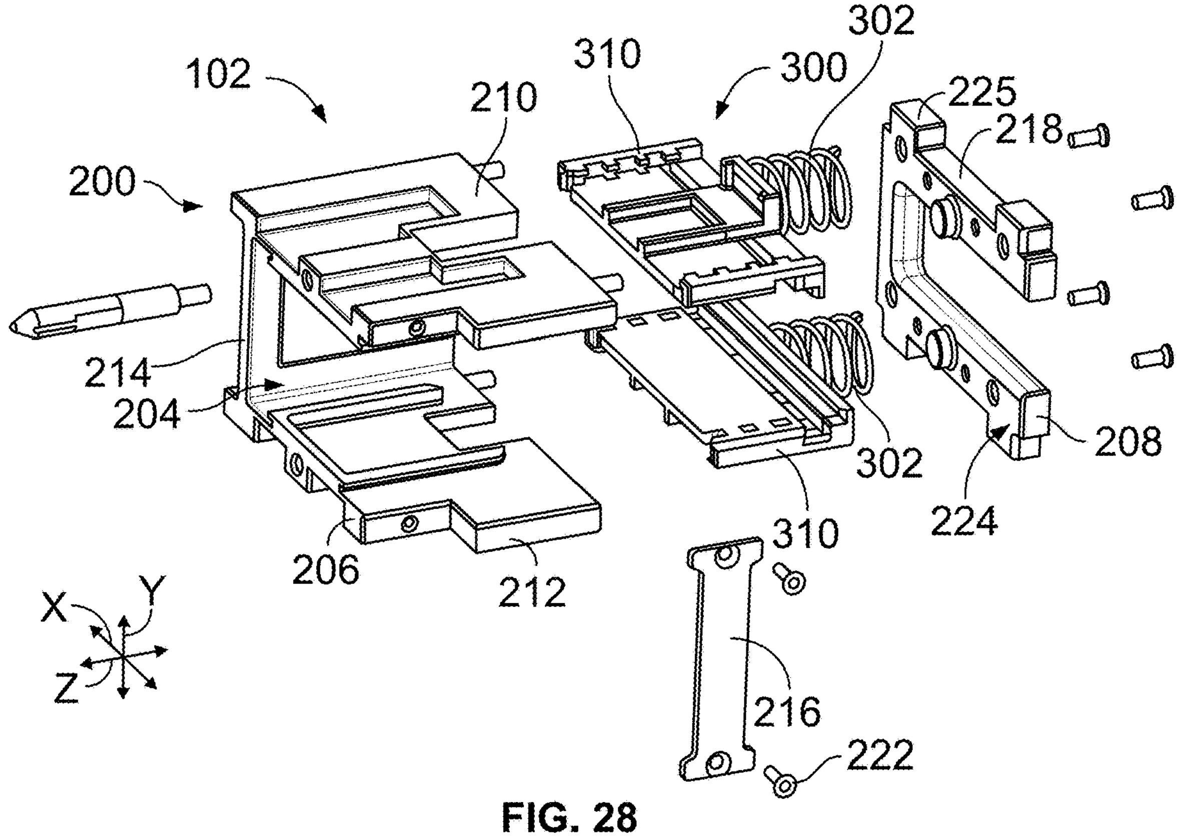
FIG. 28 is a front perspective, exploded view of a portion of the connector assembly with the cable connector removed to illustrate other components of the connector assembly.
Figure 29:
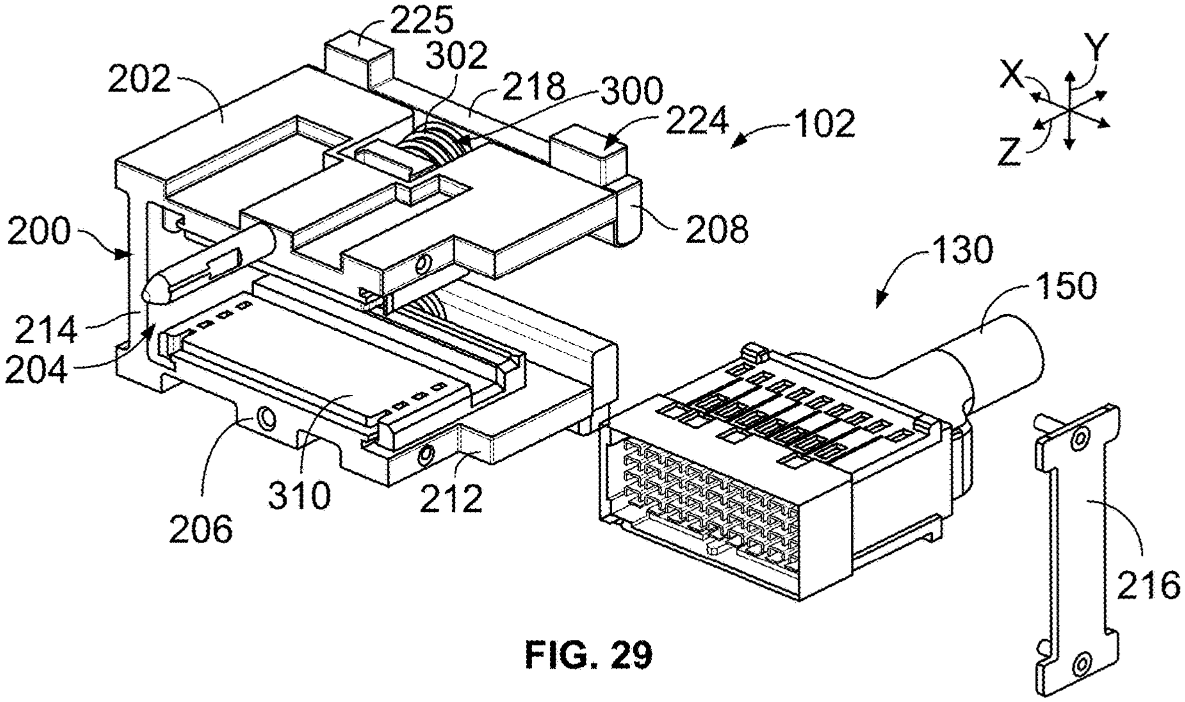
FIG. 29 is a front perspective, exploded view of the connector assembly in accordance with an exemplary embodiment.

FIG. 27 is a front perspective view of the connector assembly 102 in accordance with an exemplary embodiment. FIG. 28 is a front perspective, exploded view of a portion of the connector assembly 102 with the cable connector 130 removed to illustrate other components of the connector assembly 102. FIG. 29 is a front perspective, exploded view of the connector assembly 102 in accordance with an exemplary embodiment. The connector assembly 102 is similar to the connector assembly 102 shown in FIGS. 4-6; however, the connector assembly 102 shown in FIGS. 27-29 include different mounting features for mounting the connector assembly 102 in the cartridge 110 (FIG. 3).

The connector assembly 102 includes the connector holder 200 used to hold the cable connector 130. The connector holder 200 is configured to be coupled to the cartridge 110 to position the cable connector 130 relative to the cartridge 110. In an exemplary embodiment, the cable connector 130 is movable relative to the connector holder 200 to position the cable connector 130 during mating with the mating electrical connector 106 (FIG. 2). For example, the cable connector 130 may be movable along the mating axis 126 (along the Z-axis) to accommodate overtravel of the mating connector assembly 104 during mating. In various embodiments, the cable connector 130 may have a limited amount of floating movement relative to the connector holder 200 to accommodate misalignment of the cable connector 130 relative to the mating electrical connector 106. For example, the cable connector 130 may be movable relative to the connector holder 200 along the X-axis and/or along the Y-axis to accommodate misalignment of the cable connector 130 relative to the mating electrical connector 106. The connector holder 200 may limit or confine the amount of floating movement in the lateral floating directions X/Y. For example, the connector holder 200 may limit floating movement to 1.0 mm.

The connector holder 200 includes the frame 202 defining the connector chamber 204. The cable connector 130 is received in the connector chamber 204. The frame 202 supports the cable connector 130 in the connector chamber 204. The mating end of the cable connector 130 is provided at or forward of the front 206 of the connector holder 200 for mating with the mating electrical connector 106. The cable 150 extends from the rear 208 of the connector holder 200. The mating guide 120 extends forward from the front 206, such as above the cable connector 130. Other locations are possible in alternative embodiments, such as the bottom for one or both sides of the frame 202.

In an exemplary embodiment, the frame 202 includes the upper frame member 210, the lower frame member 212, the first side frame member 214, the second side frame member 216, and the rear frame member 218. The connector chamber 204 is defined between the upper frame member 210 and the lower frame member 212. The connector chamber 204 is defined between the first and second side frame members 214, 216. The upper frame member 210, the lower frame member 212, the first side frame member 214, and the second side frame member 216 form the brick 220 used to hold the cable connector 130. The brick 220 is configured to be coupled to the cartridge 110 to hold the cable connector 130 relative to the cartridge 110. The rear frame member 218 may be coupled to the brick 220. The rear frame member 218 closes off the connector chamber 204 from behind.

In an exemplary embodiment, the second side frame member 216 is separate and discrete from the upper and lower frame members 210, 212. The second side frame member 216 is coupled to the upper and lower frame members 210, 212 using fasteners 222. The second side frame member 216 may be coupled to the upper and lower frame members 210, 212 after the cable connector 130 is loaded into the connector chamber 204 through the second side. However, in alternative embodiments, the second side frame member 216 may be integral with the upper frame member 210 and/or the lower frame member 212, such as being diecast with and/or stamped and formed from a common metal material.

In an exemplary embodiment, the first side frame member 214 is integral with the upper and lower frame members 210, 212. For example, the first side frame member 214 may be diecast with the upper and lower frame members 210, 212 into a U-shaped structure having a closed first side and open second side configured to receive the cable connector 130 into the connector chamber 204 through the open second side. However, in alternative embodiments, the first side frame member 214 may be separate and discrete from the upper and lower frame members 210, 212 and coupled thereto using fasteners.

In an exemplary embodiment, the rear frame member 218 is coupled to the upper frame member 210 and/or the lower frame member 212 using fasteners. The rear frame member 218 may be fixed in place relative to the upper and lower frame members 210, 212 using the fasteners. However, in alternative embodiments, the rear frame member 218 may be separate from the upper and lower frame members 210, 212, which may allow the upper and lower frame members 210, 212 to move relative to the rear frame member 218, such as to allow the cable connector 130 to move relative to the rear frame member 218 (for example, along the mating axis in the Z-direction).

In an exemplary embodiment, mounting features 224 extend from the brick 220 to mount the brick 220 to the cartridge 110. In the illustrated embodiment, the mounting features 224 are mounting tabs 225 extending from the rear frame member 218. The mounting features 224 may additionally or alternatively extend from the upper frame member 210 and the lower frame member 212. The mounting tabs 225 may be provided proximate to the first and second sides, such as to interface with the cartridge 110. The mounting tabs 225 are rectangular shaped; however, the mounting tabs 225 may have other shapes in alternative embodiments. Other types of mounting features may be used in alternative embodiments. The mounting features 224 may be located at other locations in alternative embodiments.

In an exemplary embodiment, the connector assembly 102 includes the biasing assembly 300 operably coupled between the cable connector 130 and the connector holder 200. The biasing assembly 300 allows the cable connector 130 to move relative to the connector holder 200. For example, the biasing assembly 300 allows the cable connector 130 to move along the mating axis 126 (Z-direction), such as to accommodate overtravel of the mating connector assembly 104 during mating. In an exemplary embodiment, the biasing assembly 300 includes the biasing members 302.

The biasing assembly 300 includes the sliders 310 between the biasing member 302 and the cable connector 130. The sliders 310 are movable relative to the brick 220.

The sliders 310 hold the cable connector 130 and allow the cable connector 130 to move relative to the brick 220. The biasing members 302 forward bias the sliders 310 and thus the cable connector 130 relative to the rear frame member 218 and hold the cable connector 130 in a forward position for mating with the mating electrical connector 106.

Figure 30:
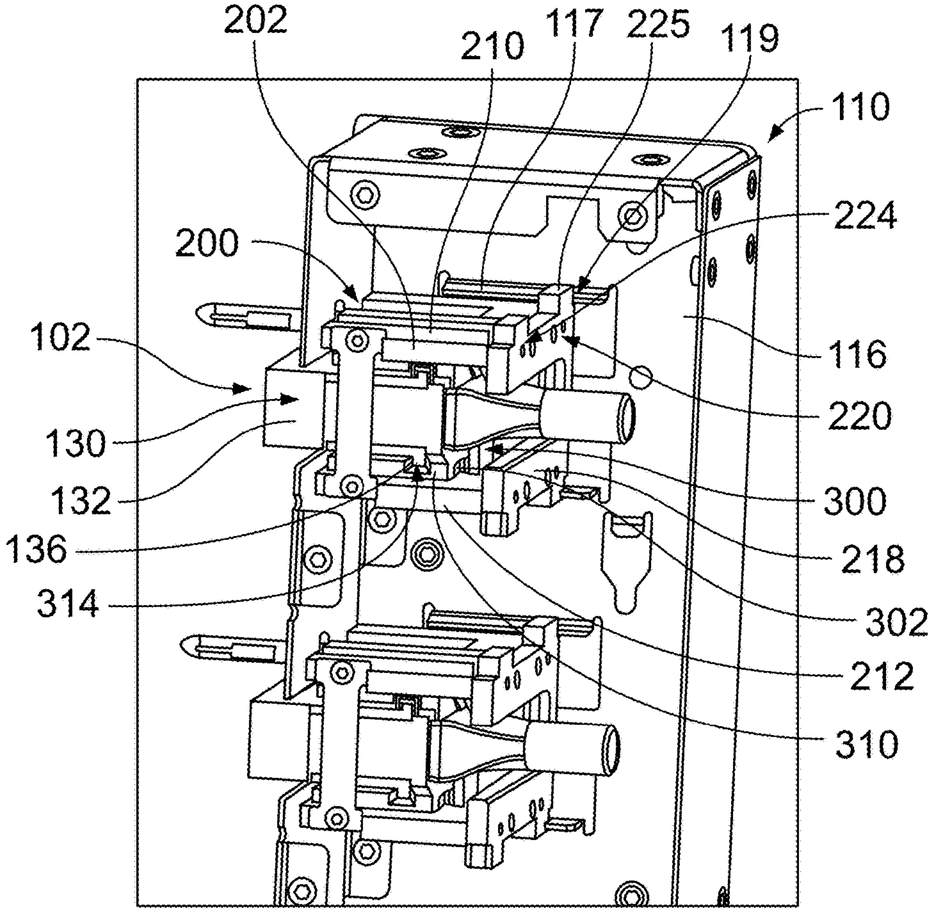
FIG. 30 is a front perspective, partial assembled view of a portion of the connector assembly in accordance with an exemplary embodiment.

FIG. 30 is a front perspective, partial assembled view of a portion of the connector assembly 102. During assembly, the frame 202 is coupled to the first side panel 116 of the cartridge 110. In an exemplary embodiment, the side panel 116 of the cartridge 110 includes shelves 117 extending inward into the interior of the cartridge 110. The shelves 117 include slots 119 configured to receive the mounting tabs 225 of the mounting features 224 of the connector assembly 102. In an exemplary embodiment, the shelves 117 are integral with the side panel 116, such as being stamped and formed with the side panel 116. The shelves 117 are folded inward from the side panel 116. The mounting tabs 225 are received in the slots 119 to locate the frame 202 relative to the cartridge 110. Optionally, threaded fasteners may be used to secure the frame 202 to the side panel 116. The second side panel 118 (FIG. 1) of the cartridge 110 may be coupled to the second sides of the connector assembly 102 after the connector assembly 102 is positioned in the interior of the cartridge 110. The second side panel 118 may include similar shelves and slots that receive the mounting tabs 225 at the second side of the connector assembly 102.

In an exemplary embodiment, the cable connector 130 is able to move relative to the connector holder 200 in a floating direction to accommodate misalignment of the mating electrical connector 106 and the cable connector 130. For example, the connector housing 132 of the cable connector 130 may move in the horizontal direction (X-direction) relative to the slider 310 to align the cable connector 130 with the mating electrical connector 106. The mounting lugs 136 are movable side-to-side within the slot 314 to accommodate the floating movement in the horizontal direction. The mounting lugs 136 may move side to side until the mounting lugs 136 and/or the connector housing 132 engage the first and second sides frame members 214, 216.

In an exemplary embodiment, the connector holder 200 may be movable relative to the cartridge 110 to accommodate misalignment between the cable connector 130 and the mating electrical connector 106. For example, the connector holder 200 may be movable relative to the cartridge 110 to accommodate misalignment between the cable connector 130 and the mating electrical connector 106. The mounting tabs 225 holding the connector holder 200 to the panels 112 of the cartridge 110 may be slidable or movable within the slots 119. For example, the slots 119 that receive the mounting tabs 225 may be elongated or oversized to allow floating movement of the mounting tabs 225 within the slots 119 to allow a limited amount of vertical and/or horizontal floating movement. During mating, once fully mated, further loading of the mating connector assembly 104 in the mating direction causes compression of the biasing assembly 300. For example, the biasing members 302 are compressed allowing the sliders 310 and the cable connector 130 to move in a rearward compression direction to accommodate the overloading of the mating connector assembly 104. The sliders 310 and the cable connector 130 are moved in the rearward compression direction toward the rear frame member 218. The sliders 310 slide relative to the brick 220. For example, the sliders 310 slide rearward relative to the upper frame member 210 and the lower frame member 212. The mounting lugs 136 transfer forces and movement between the cable connector 130 and the sliders 310.

The biasing members 302 are compressible in the rearward compression direction to allow the cable connector 130 to move to a rearward position, which prevents damage to the cable connector 130 and the mating electrical connector 106 during the mating process. In an exemplary embodiment, the biasing members 302 may be preloaded to a predetermined spring force. As such, the biasing members 302 are not compressed until the predetermined spring force is exceeded. The preload spring force may be greater than the mating force to fully mate the mating electrical connector 106 with the cable connector 130. For example, the mating force may be defined by the force required to mate the signal contacts and the shields. In various embodiments, the mating force may be less than 20 pounds. The preload spring force may be set at 20 pounds to allow mating of the signal contacts and the shields without rearward movement of the cable connector 130. The biasing members 302 compress only when the preload force is exceeded.

Figure 31:
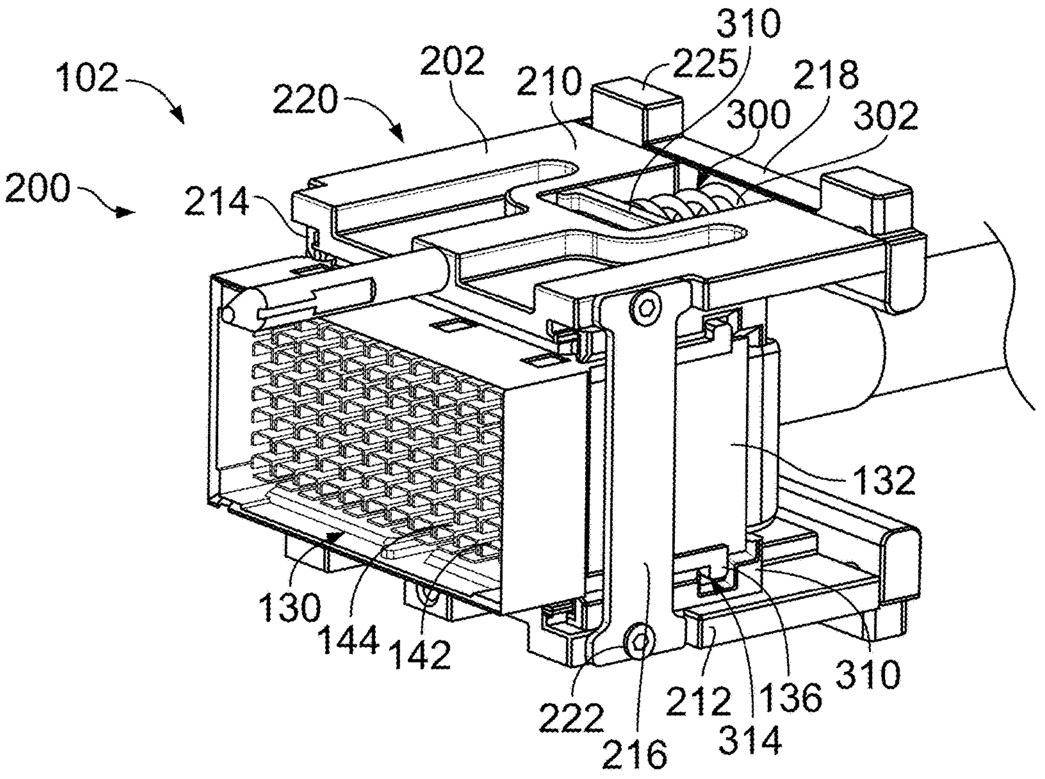
FIG. 31 is a front perspective view of the connector assembly in accordance with an exemplary embodiment.
Figure 32:
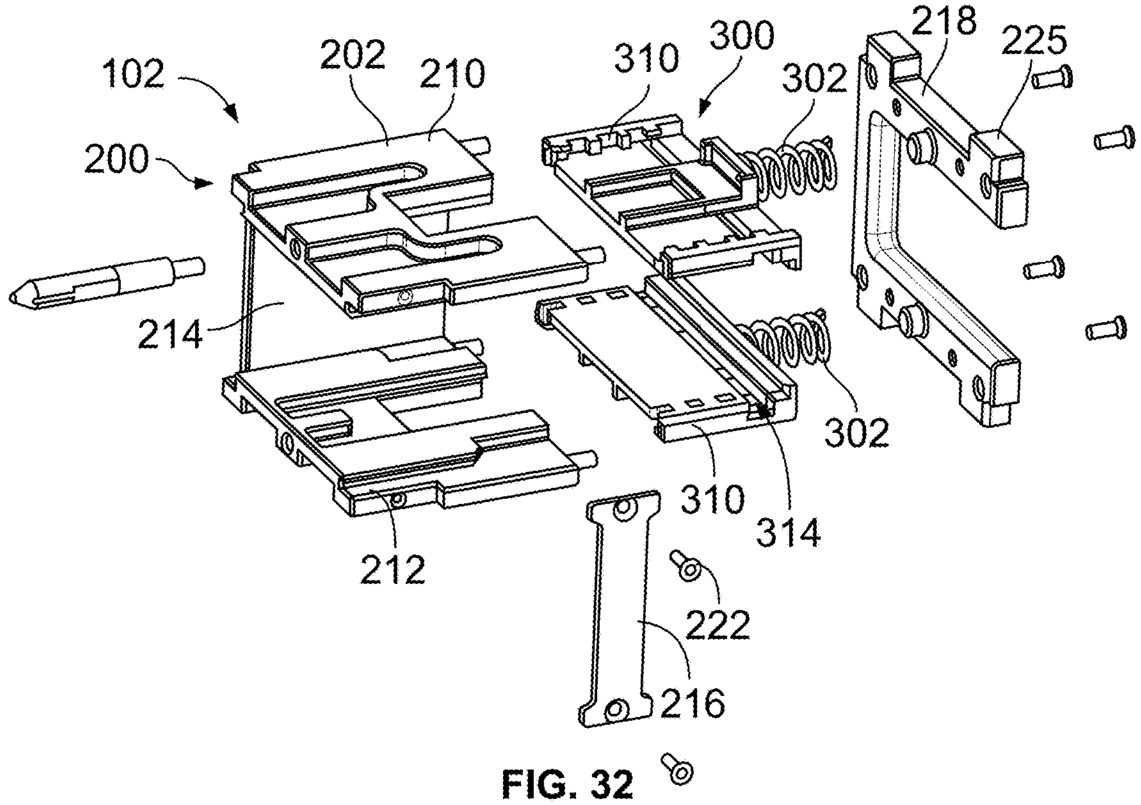
FIG. 32 is a front perspective, exploded view of a portion of the connector assembly with the cable connector removed to illustrate other components of the connector assembly.
Figure 33:
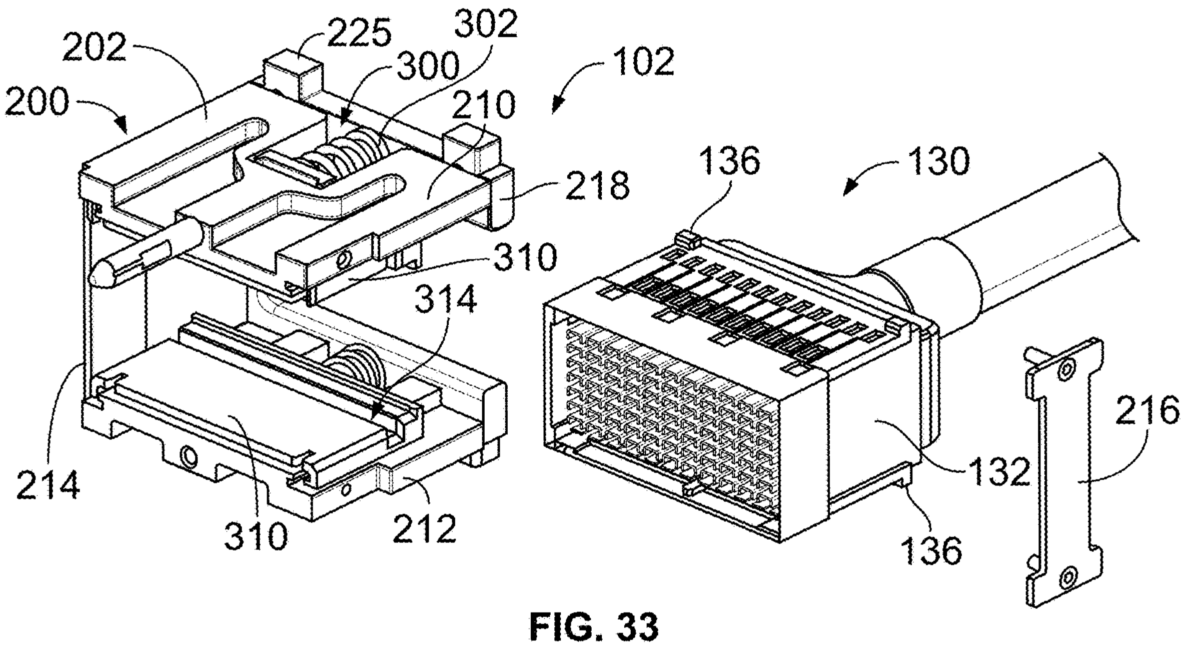
FIG. 33 is a front perspective, exploded view of the connector assembly in accordance with an exemplary embodiment.

FIG. 31 is a front perspective view of the connector assembly 102 in accordance with an exemplary embodiment. FIG. 32 is a front perspective, exploded view of a portion of the connector assembly 102 with the cable connector 130 removed to illustrate other components of the connector assembly 102. FIG. 33 is a front perspective, exploded view of the connector assembly 102 in accordance with an exemplary embodiment. The cable connector 130 shown in FIGS. 31-33 is a different sized cable connector than shown in FIGS. 27-29 having greater rows and columns of the signal contacts 142 and shields 144.

The connector assembly 102 includes the connector holder 200 used to hold the cable connector 130. The frame 202 of the connector holder 200 includes the upper frame member 210, the lower frame member 212, the first side frame member 214, the second side frame member 216, and the rear frame member 218. In the illustrated embodiment, the first side frame member 214 is separate and discrete from the upper and lower frame members 210, 212 and coupled thereto similar to the second side frame member 216 using fasteners 222 to form the brick 220. The rear frame member 218 includes the mounting tabs 225 used to position the connector assembly 102 relative to the cartridge 110.

The biasing assembly 300 is operably coupled between the cable connector 130 and the connector holder 200. The biasing assembly 300 allows the cable connector 130 to move relative to the connector holder 200. For example, the biasing assembly 300 allows the cable connector 130 to move along the mating axis 126 (Z-direction), such as to accommodate overtravel of the mating connector assembly 104 during mating. The biasing members 302 are coupled to the rear frame member 218 and the sliders 310. The sliders 310 are movable relative to the brick 220 and allow the cable connector 130 to move relative to the brick 220. The biasing members 302 forward bias the sliders 310 and thus the cable connector 130 relative to the rear frame member 218 and hold the cable connector 130 in a forward position for mating with the mating electrical connector 106. The mounting lugs 136 are received in the slots 314 to position the cable connector 130 relative to the sliders 310. The mounting lugs 136 are able to move side-to-side (X-direction) within the slots 314 to allow a limited amount of lateral floating movement of the cable connector 130 relative to the slider 310. The spacing between the sliders 310 may be slightly taller than the height of the connector housing 132 to allow a limited amount of vertical floating movement (Y-direction) of the cable connector 130 between the sliders 310.

Figure 34:
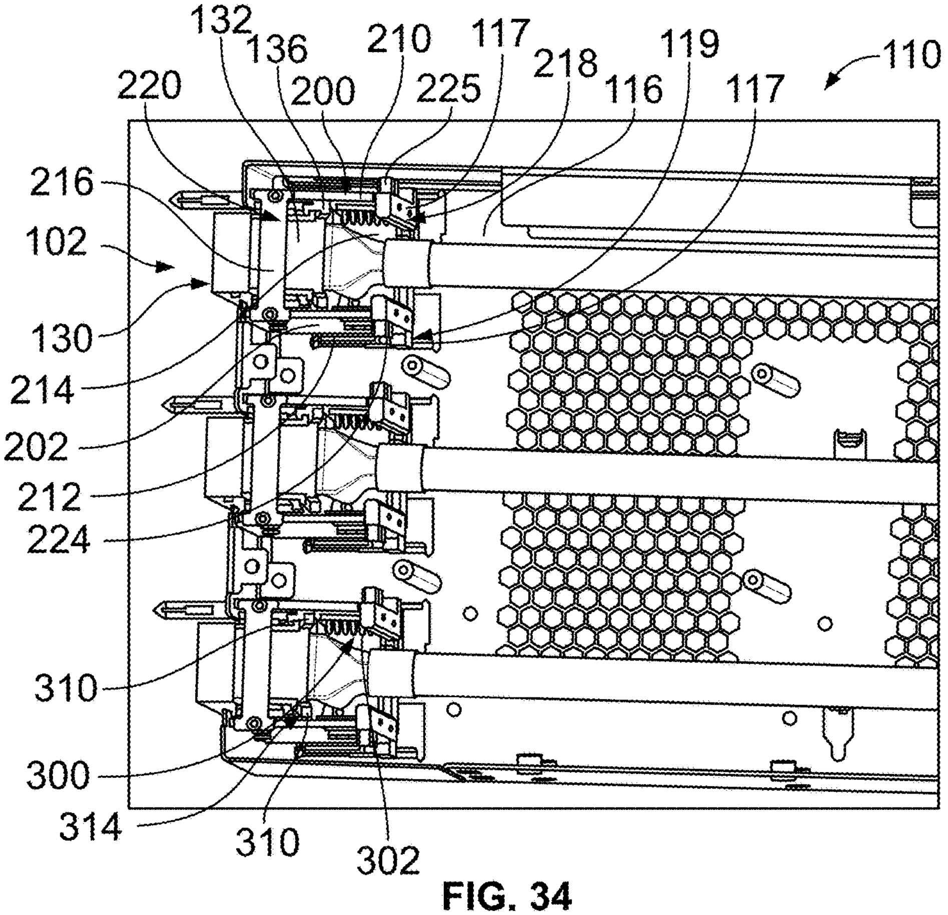
FIG. 34 is a front perspective, partial assembled view of a portion of the connector assembly in accordance with an exemplary embodiment.

FIG. 34 is a front perspective, partial assembled view of a portion of the connector assembly 102. During assembly, the frame 202 is coupled to the first side panel 116 of the cartridge 110. In an exemplary embodiment, the side panel 116 of the cartridge 110 includes the shelves 117 extending inward into the interior of the cartridge 110. The shelves 117 include the slots 119 configured to receive the mounting tabs 225 of the mounting features 224 of the connector assembly 102. In an exemplary embodiment, the shelves 117 are integral with the side panel 116, such as being stamped and formed with the side panel 116. The shelves 117 are folded inward from the side panel 116. The mounting tabs 225 are received in the slots 119 to locate the frame 202 relative to the cartridge 110. Optionally, threaded fasteners may be used to secure the frame 202 to the side panel 116. The second side panel 118 (FIG. 1) of the cartridge 110 may be coupled to the second sides of the connector assembly 102 after the connector assembly 102 is positioned in the interior of the cartridge 110. The second side panel 118 may include similar shelves and slots that receive the mounting tabs 225 at the second side of the connector assembly 102.

In an exemplary embodiment, the cable connector 130 is able to move relative to the connector holder 200 in a floating direction to accommodate misalignment of the mating electrical connector 106 and the cable connector 130. For example, the connector housing 132 of the cable connector 130 may move in the horizontal direction (X-direction) relative to the slider 310 to align the cable connector 130 with the mating electrical connector 106. The mounting lugs 136 are movable side-to-side within the slot 314 to accommodate the floating movement in the horizontal direction. The mounting lugs 136 may move side to side until the mounting lugs 136 and/or the connector housing 132 engage the first and second sides frame members 214, 216.

In an exemplary embodiment, the connector holder 200 may be movable relative to the cartridge 110 to accommodate misalignment between the cable connector 130 and the mating electrical connector 106. For example, the connector holder 200 may be movable relative to the cartridge 110 to accommodate misalignment between the cable connector 130 and the mating electrical connector 106. The mounting tabs 225 holding the connector holder 200 to the panels 112 of the cartridge 110 may be slidable or movable within the slots 119. For example, the slots 119 that receive the mounting tabs 225 may be elongated or oversized to allow floating movement of the mounting tabs 225 within the slots 119 to allow a limited amount of vertical and/or horizontal floating movement. During mating, once fully mated, further loading of the mating connector assembly 104 in the mating direction causes compression of the biasing assembly 300. For example, the biasing members 302 are compressed allowing the sliders 310 and the cable connector 130 to move in a rearward compression direction to accommodate the overloading of the mating connector assembly 104. The sliders 310 and the cable connector 130 are moved in the rearward compression direction toward the rear frame member 218. The sliders 310 slide relative to the brick 220. For example, the sliders 310 slide rearward relative to the upper frame member 210 and the lower frame member 212. The mounting lugs 136 transfer forces and movement between the cable connector 130 and the sliders 310.

The biasing members 302 are compressible in the rearward compression direction to allow the cable connector 130 to move to a rearward position, which prevents damage to the cable connector 130 and the mating electrical connector 106 during the mating process. In an exemplary embodiment, the biasing members 302 may be preloaded to a predetermined spring force. As such, the biasing members 302 are not compressed until the predetermined spring force is exceeded. The preload spring force may be greater than the mating force to fully mate the mating electrical connector 106 with the cable connector 130. For example, the mating force may be defined by the force required to mate the signal contacts and the shields. In various embodiments, the mating force may be less than 20 pounds. The preload spring force may be set at 20 pounds to allow mating of the signal contacts and the shields without rearward movement of the cable connector 130. The biasing members 302 compress only when the preload force is exceeded.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A connector assembly comprising:

a connector holder having a frame defining a connector chamber, the frame extending between a front and a rear of the connector holder, the frame including an upper frame member, a lower frame member, and first and second side frame members extending between the upper and lower frame members to define the connector chamber, the frame including a rear frame member extending between the first and second side frame members and between the upper and lower frame members rearward of the connector chamber, wherein the upper frame member, the lower frame member, the first side frame member, the second side frame member, and the rear frame member being fixed relative to each other;

a cable connector received in the connector chamber, the cable connector including a connector housing holding contact assemblies, each contact assembly including a signal contact and a cable terminated to the signal contact;

a biasing member operably coupled to the rear frame member between the cable connector and the rear frame member of the connector holder, the biasing member forward biasing the cable connector, the biasing member being compressible in a rearward compression direction to allow the cable connector to move rearward relative to the rear frame member; and a slider received in the connector chamber and slidably coupled to the frame, the cable connector being coupled to the slider and movable with the slider.

2. The connector assembly of claim 1, wherein the cable connector includes a mating end at a front of the connector housing, the mating end configured to be mated with a mating connector along a mating axis, the biasing member being compressible in the rearward compression direction to allow the cable connector to move along the mating axis during mating with the mating connector.

3. The connector assembly of claim 1, wherein the cable connector has a limited amount of floating movement within the connector chamber in at least one floating direction perpendicular to a mating axis of the cable connector with a mating connector.

4. The connector assembly of claim 1, wherein the biasing member engages the slider to forward bias the slider to a forward position, the cable connector and the slider being movable to a rearward position during mating with a mating connector, the biasing member being compressed when the cable connector and the slider are moved to the rearward position.

5. The connector assembly of claim 1, wherein the slider includes a slot, the connector housing including a locating lug received in the slot, the slot being oversized relative to the locating lug to allow a limited amount of floating movement of the locating lug within the slot in at least one floating direction perpendicular to a mating axis of the cable connector with a mating connector.

6. The connector assembly of claim 1, wherein the rear frame member is fixed relative to at least one of the upper frame member and the lower frame member.

7. The connector assembly of claim 1, wherein the first side frame member is integral with at least one of the upper frame member and the lower frame member.

8. The connector assembly of claim 1, wherein the frame includes mounting features extending from the frame configured to position the connector assembly relative to a cartridge.

9. The connector assembly of claim 1, wherein the biasing member includes a rear end coupled to the rear frame member.

10. The connector assembly of claim 9, wherein the biasing member includes a front end coupled to the slider holding the cable connector, the slider moving the cable connector relative to the frame.

11. The connector assembly of claim 9, wherein the biasing member includes a front end coupled to the first side frame member to bias the first side frame member forward relative to the rear frame member.

12. The connector assembly of claim 1, the slider having a rear end coupled to the rear frame member and a front end configured to be coupled to a panel, the slider fixing a position of the rear frame member relative to the panel, wherein the upper frame member, the lower frame member, and the first and second side frame members form a brick holding the cable connector, the brick being slidable on the slider relative to the rear frame member and the panel, the biasing member forward biasing the brick on the slider.

13. The connector assembly of claim 12, wherein the first side frame member includes a channel, the slider passing through the channel, a front end of the biasing member being received in the channel.

14. A connector assembly comprising:

a connector holder having a frame defining a connector chamber, the frame extending between a front and a rear of the connector holder, the frame including an upper frame member, a lower frame member, and first and second side frame members extending between the upper and lower frame members to define the connector chamber, the frame including a rear frame member extending between the first and second side frame members and between the upper and lower frame members rearward of the connector chamber, wherein the upper frame member, the lower frame member, the first side frame member, the second side frame member, and the rear frame member being fixed relative to each other;

a cable connector received in the connector chamber, the cable connector including a connector housing holding contact assemblies, each contact assembly including a signal contact and a cable terminated to the signal contact;

a biasing assembly operably coupled to the rear frame member between the cable connector and the rear frame member of the connector holder, the biasing assembly including a biasing member and a slider, the slider being coupled to the cable connector and holding the cable connector relative to the frame, the slider slidably coupled to the frame and movable between a forward position and a rearward position, the biasing member coupled to the slider and coupled to the rear frame member, the biasing member forward biasing the slider and the cable connector to the forward position, the biasing member being compressible in a rearward compression direction when the slider and the cable connector are moved to the rearward position.

15. The connector assembly of claim 14, wherein the biasing member includes a rear end coupled to the rear frame member and a front end coupled to a slider holding the cable connector, the slider moving the cable connector relative to the frame.

16. The connector assembly of claim 14, wherein the cable connector has a limited amount of floating movement within the connector chamber in at least one floating direction perpendicular to a mating axis of the cable connector with a mating connector.

17. The connector assembly of claim 14, wherein the slider includes a slot, the connector housing including a locating lug received in the slot, the slot being oversized relative to the locating lug to allow a limited amount of floating movement of the locating lug within the slot in at least one floating direction perpendicular to a mating axis of the cable connector with a mating connector.

18. A connector assembly comprising:

a connector holder having a frame defining a connector chamber, the frame extending between a front and a rear of the connector holder, the frame including a brick having an upper frame member, a lower frame member, and first and second side frame members extending between the upper and lower frame members to define the connector chamber, the frame including a rear frame member rearward of the brick extending between the first and second side frame members and between the upper and lower frame members, wherein the upper frame member, the lower frame member, the first side frame member, the second side frame member, and the rear frame member being fixed relative to each other, the brick including a channel;

a cable connector received in the connector chamber and coupled to the brick, the cable connector including a connector housing holding contact assemblies, each contact assembly including a signal contact and a cable terminated to the signal contact;

a biasing assembly operably coupled to the rear frame member between the cable connector and the rear frame member of the connector holder, the biasing assembly including a biasing member and a slider, the slider being received in the channel, the slider having a rear end coupled to the rear frame member, the slider including a front end having a panel mount forward of the brick configured to be mounted to a panel, wherein the brick is slidable along the slider between a forward position and a rearward position, the biasing member coupled between the rear frame member and the brick, the biasing member forward biasing the brick and the cable connector to the forward position, the biasing member being compressible in a rearward compression direction when the brick and the cable connector are moved to the rearward position.

19. The connector assembly of claim 18, wherein the cable connector has a limited amount of floating movement within the connector chamber in at least one floating direction perpendicular to a mating axis of the cable connector with a mating connector.

* * * * *